(12) United States Patent
Bridy et al.

(10) Patent No.: US 10,007,950 B2
(45) Date of Patent: Jun. 26, 2018

(54) INTEGRATING MULTIPLE TRADING PLATFORMS WITH A CENTRAL TRADE PROCESSING SYSTEM

(71) Applicant: Bank of America Corporation, Charlotte, NC (US)

(72) Inventors: William A. Bridy, Jacksonville, FL (US); Valerie J. Redmond, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 505 days.

(21) Appl. No.: 14/825,713

(22) Filed: Aug. 13, 2015

(65) Prior Publication Data

US 2017/0046782 A1    Feb. 16, 2017

(51) Int. Cl.
  *G06Q 40/04*  (2012.01)

(52) U.S. Cl.
  CPC .................................. *G06Q 40/04* (2013.01)

(58) Field of Classification Search
  CPC .............................. G06Q 40/04; G06Q 40/06
  USPC ................................................. 705/36 R, 37
  See application file for complete search history.

(56) References Cited

U.S. PATENT DOCUMENTS

| | | | | |
|---|---|---|---|---|
| 2004/0230517 A1* | 11/2004 | Crosthwaite | ........... | G06Q 30/04 705/37 |
| 2010/0057600 A1* | 3/2010 | Johansen | .................. | G06F 8/34 705/37 |
| 2010/0057608 A1 | 3/2010 | McPherson | | |
| 2010/0076883 A1 | 3/2010 | Lutnick et al. | | |
| 2010/0076884 A1 | 3/2010 | Lutnick et al. | | |
| 2010/0076896 A1 | 3/2010 | Lutnick et al. | | |
| 2010/0082495 A1 | 4/2010 | Lutnick et al. | | |
| 2010/0082500 A1 | 4/2010 | Lutnick et al. | | |
| 2010/0106636 A1 | 4/2010 | Lutnick et al. | | |
| 2010/0138357 A1* | 6/2010 | Mufti-Bey | ............. | G06Q 40/04 705/36 R |
| 2010/0185562 A1 | 7/2010 | Nafeh | | |
| 2010/0191637 A1 | 7/2010 | Alderucci et al. | | |
| 2010/0191638 A1 | 7/2010 | Alderucci et al. | | |
| 2010/0235270 A1 | 9/2010 | Baker | | |
| 2010/0241589 A1 | 9/2010 | Honorowski | | |
| 2010/0250363 A1 | 9/2010 | Magdon-Ismail et al. | | |

(Continued)

*Primary Examiner* — Jagdish Patel
(74) *Attorney, Agent, or Firm* — Banner & Witcoff, Ltd.; Michael A. Springs

(57) ABSTRACT

Methods, systems, and computer-readable media for integrating multiple trading platforms with a central trade processing system are presented. In some embodiments, a central trade processing computing platform may receive, from a trading engine computer system, a request for interface information. The computing platform may load trading interface data that includes product information associated with a set of one or more financial products offered via a trading interface provided by the trading engine computer system and interface layout information associated with the trading interface. The computing platform may send, to the trading engine computer system, the trading interface data. Thereafter, the computing platform may receive, from the trading engine computer system, trading information defining a set of one or more trades. The central trade processing computing platform may process the set of one or more trades and may send, to the trading engine computer system, trade results information.

19 Claims, 18 Drawing Sheets

(56) References Cited

U.S. PATENT DOCUMENTS

| | | |
|---|---|---|
| 2010/0257087 A1 | 10/2010 | Watt, II et al. |
| 2010/0318456 A1 | 12/2010 | Bleunven et al. |
| 2010/0332368 A1 | 12/2010 | Alderucci et al. |
| 2011/0022494 A1 | 1/2011 | Lutnick et al. |
| 2011/0022542 A1 | 1/2011 | Lutnick et al. |
| 2011/0047099 A1 | 2/2011 | O'Neill |
| 2011/0071958 A1 | 3/2011 | Grody et al. |
| 2011/0119176 A1 | 5/2011 | Hanson et al. |
| 2011/0137785 A1 | 6/2011 | Lutnick et al. |
| 2011/0137786 A1 | 6/2011 | Lutnick et al. |
| 2011/0145127 A1 | 6/2011 | Hagerman et al. |
| 2011/0173135 A1 | 7/2011 | Xu |
| 2011/0246390 A1 | 10/2011 | Yang |
| 2011/0270738 A1 | 11/2011 | Watt, II et al. |
| 2011/0276456 A1* | 11/2011 | Tzroya .................. G06Q 40/04 705/37 |
| 2011/0313948 A1 | 12/2011 | Hagerman et al. |
| 2012/0005062 A1 | 1/2012 | Lutnick et al. |
| 2012/0011054 A1 | 1/2012 | Grody et al. |
| 2012/0041861 A1 | 2/2012 | Nafeh et al. |
| 2012/0185373 A1 | 7/2012 | Grody |
| 2013/0006827 A1 | 1/2013 | Kaus |
| 2013/0013483 A1 | 1/2013 | Dale et al. |
| 2013/0046673 A1 | 2/2013 | Kiron |
| 2013/0103540 A1 | 4/2013 | Lutnick et al. |
| 2013/0103565 A1 | 4/2013 | Watt, II et al. |
| 2013/0110742 A1 | 5/2013 | Golembiewski et al. |
| 2013/0124379 A1 | 5/2013 | Gilbert |
| 2013/0297530 A1 | 11/2013 | Bell et al. |
| 2013/0304671 A1 | 11/2013 | Renshaw |
| 2013/0317930 A1 | 11/2013 | Lutnick et al. |
| 2014/0019327 A1 | 1/2014 | Lutnick et al. |
| 2014/0052619 A1 | 2/2014 | Luten et al. |
| 2014/0180897 A1 | 6/2014 | Dale et al. |
| 2014/0201107 A1 | 7/2014 | Bell et al. |
| 2014/0236803 A1 | 8/2014 | Lutnick et al. |
| 2014/0279364 A1* | 9/2014 | Sandhu .................. G06Q 40/04 705/37 |
| 2014/0297560 A1 | 10/2014 | Yang et al. |
| 2014/0330688 A1 | 11/2014 | DiNardo et al. |
| 2015/0134568 A1 | 5/2015 | Riggs |

\* cited by examiner

INTEGRATING MULTIPLE TRADING PLATFORMS WITH A CENTRAL TRADE PROCESSING SYSTEM

BACKGROUND

Aspects of the disclosure relate to computer hardware and software. In particular, one or more aspects of the disclosure generally relate to computer hardware and software for integrating multiple trading platforms with a central trade processing system.

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. As a result of this complexity, it may be difficult for a large organization, such as a financial institution, to efficiently, effectively, and uniformly manage how internal users and/or external users interact with various different products and/or services associated with the organization.

SUMMARY

Aspects of the disclosure relate to computer systems that provide effective, efficient, scalable, and convenient ways of uniformly managing how different users interact with various different products and/or services associated with an organization, such as a financial institution.

For example, one or more aspects of the disclosure relate to a central trade processing system that may perform various functions and may integrate with multiple different trading platforms operated by an organization, such as a financial institution. As illustrated in greater detail below, the central trade processing system may enable real-time processing of trades that are received via different trading platforms operated by an organization, such as a financial institution. For instance, a financial institution may provide a first trading platform for use by certain users for trading in certain financial products, such as mutual funds and/or mutual fund derivatives, and the financial institution may provide a second trading platform for use by certain other users for trading in the same and/or other financial products. By integrating these and/or other trading platforms operated by the financial institution with the central trade processing system discussed in greater detail below, the financial institution may, for instance, be able to ensure efficient, effective, consistent, and error-free operation of the various trading platforms operated by the financial institution. For example, the central trade processing system discussed in greater detail below may enable a financial institution to process trades received from different trading platforms in real-time as such trades are received via the different trading platforms, so as to reduce the number of errors that might otherwise be encountered if, for instance, an alternative arrangement was used in which trades were processed periodically in batches at the end of each business day.

In accordance with one or more embodiments, a central trade processing computing platform having at least one processor, a memory, and a communication interface may receive, via the communication interface, and from a first trading engine computer system, a first request for first interface information. Based on receiving the first request for the first interface information from the first trading engine computer system, the central trade processing computing platform may load first trading interface data, and the first trading interface data may include first product information associated with a first set of one or more financial products offered via a first trading interface provided by the first trading engine computer system and first interface layout information associated with the first trading interface provided by the first trading engine computer system. Subsequently, the central trade processing computing platform may send, via the communication interface, and to the first trading engine computer system, the first trading interface data. Thereafter, the central trade processing computing platform may receive, via the communication interface, and from the first trading engine computer system, first trading information defining a first set of one or more trades associated with the first set of one or more financial products offered via the first trading interface provided by the first trading engine computer system. Based on the first trading information defining the first set of one or more trades received from the first trading engine computer system, the central trade processing computing platform may process the first set of one or more trades associated with the first set of one or more financial products offered via the first trading interface provided by the first trading engine computer system. Based on processing the first set of one or more trades associated with the first set of one or more financial products offered via the first trading interface provided by the first trading engine computer system, the central trade processing computing platform may send, via the communication interface, and to the first trading engine computer system, first trade results information.

In some embodiments, the first product information associated with the first set of one or more financial products offered via the first trading interface provided by the first trading engine computer system may include first product rules information defining one or more rules for trading in the first set of one or more financial products offered via the first trading interface provided by the first trading engine computer system.

In some embodiments, the first set of one or more trades associated with the first set of one or more financial products offered via the first trading interface provided by the first trading engine computer system may include at least one trade associated with at least one mutual fund. Additionally or alternatively, the first set of one or more trades associated with the first set of one or more financial products offered via the first trading interface provided by the first trading engine computer system may include at least one trade associated with at least one mutual fund derivative.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is valid and pending execution.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is valid and has been executed.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is invalid and will not be executed.

In some embodiments, the central trade processing computing platform may receive, via the communication interface, and from a second trading engine computer system different from the first trading engine computer system, a second request for second interface information. Based on receiving the second request for the second interface information from the second trading engine computer system, the central trade processing computing platform may load second trading interface data different from the first trading interface data, the second trading interface data comprising second product information associated with a second set of one or more financial products offered via a second trading interface provided by the second trading engine computer system and second interface layout information associated with the second trading interface provided by the second trading engine computer system. Subsequently, the central trade processing computing platform may send, via the communication interface, and to the second trading engine computer system, the second trading interface data. Thereafter, the central trade processing computing platform may receive, via the communication interface, and from the second trading engine computer system, second trading information defining a second set of one or more trades associated with the second set of one or more financial products offered via the second trading interface provided by the second trading engine computer system. Based on the second trading information defining the second set of one or more trades received from the second trading engine computer system, the central trade processing computing platform may process the second set of one or more trades associated with the second set of one or more financial products offered via the second trading interface provided by the second trading engine computer system. Based on processing the second set of one or more trades associated with the second set of one or more financial products offered via the second trading interface provided by the second trading engine computer system, the central trade processing computing platform may send, via the communication interface, and to the second trading engine computer system, second trade results information.

In some embodiments, the second set of one or more trades associated with the second set of one or more financial products offered via the second trading interface provided by the second trading engine computer system may include at least one trade associated with at least one mutual fund. Additionally or alternatively, the second set of one or more trades associated with the second set of one or more financial products offered via the second trading interface provided by the second trading engine computer system may include at least one trade associated with at least one mutual fund derivative.

In some embodiments, the first trading interface data sent to the first trading engine computer system may be configured to cause the first trading engine computer system to present a financial-advisor-facing trading interface, and the second trading interface data sent to the second trading engine computer system may be configured to cause the second trading engine computer system to present a customer-facing trading interface.

In some embodiments, prior to receiving the first request for the first interface information from the first trading engine computer system, the central trade processing computing platform may receive, via the communication interface, and from an administrative computer system, first product rules information defining one or more rules for trading in the first set of one or more financial products offered via the first trading interface provided by the first trading engine computer system. Subsequently, the central trade processing computing platform may store, in a global funds database maintained by the central trade processing computing platform, the first product rules information defining the one or more rules for trading in the first set of one or more financial products offered via the first trading interface provided by the first trading engine computer system. Then, the central trade processing computing platform may receive, via the communication interface, and from the administrative computer system, second product rules information defining one or more rules for trading in the second set of one or more financial products offered via the second trading interface provided by the second trading engine computer system. Next, the central trade processing computing platform may store, in the global funds database maintained by the central trade processing computing platform, the second product rules information defining the one or more rules for trading in the second set of one or more financial products offered via the second trading interface provided by the second trading engine computer system.

In some embodiments, after processing the first set of one or more trades associated with the first set of one or more financial products offered via the first trading interface provided by the first trading engine computer system, the central trade processing computing platform may receive, via the communication interface, and from the administrative computer system, first rule update information defining at least one rule change to the one or more rules for trading in the first set of one or more financial products offered via the first trading interface provided by the first trading engine computer system. Subsequently, the central trade processing computing platform may store, in the global funds database maintained by the central trade processing computing platform, the first rule update information defining the at least one rule change to the one or more rules for trading in the first set of one or more financial products offered via the first trading interface provided by the first trading engine computer system. Then, the central trade processing computing platform may push the at least one rule change to the one or more rules for trading in the first set of one or more financial products to the first trading engine computer system by sending, via the communication interface, and to the first trading engine computer system, the first rule update information defining the at least one rule change to the one or more rules for trading in the first set of one or more financial products offered via the first trading interface provided by the first trading engine computer system.

In some embodiments, after processing the second set of one or more trades associated with the second set of one or more financial products offered via the second trading interface provided by the second trading engine computer system, the central trade processing computing platform may receive, via the communication interface, and from the administrative computer system, second rule update information defining at least one rule change to the one or more rules for trading in the second set of one or more financial products offered via the second trading interface provided by the second trading engine computer system. Subsequently, the central trade processing computing platform may store, in the global funds database maintained by the central trade processing computing platform, the second rule update information defining the at least one rule change to the one or more rules for trading in the second set of one or more financial products offered via the second trading interface provided by the second trading engine computer system. Then, the central trade processing computing platform may push the at least one rule change to the one or more rules for trading in the second set of one or more financial products to the second trading engine computer system by sending, via the communication interface, and to the second trading engine computer system, the second rule update information defining the at least one rule change to the one or more rules for trading in the second set of one or more financial products offered via the second trading interface provided by the second trading engine computer system.

In some embodiments, the central trade processing computing platform may receive, via the communication interface, and from the administrative computer system, a request for one or more reports. Based on receiving the request for the one or more reports from the administrative computer system, the central trade processing computing platform may generate the one or more reports based on the first trade results information and based on the second trade results information. Subsequently, the central trade processing computing platform may send, via the communication interface, and to the administrative computer system, the one or more reports generated based on the first trade results information and based on the second trade results information. In some instances, the one or more reports may include at least one trails report comprising financial advisor compensation information. In some instances, the one or more reports may include at least one billing report comprising fund group billing information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
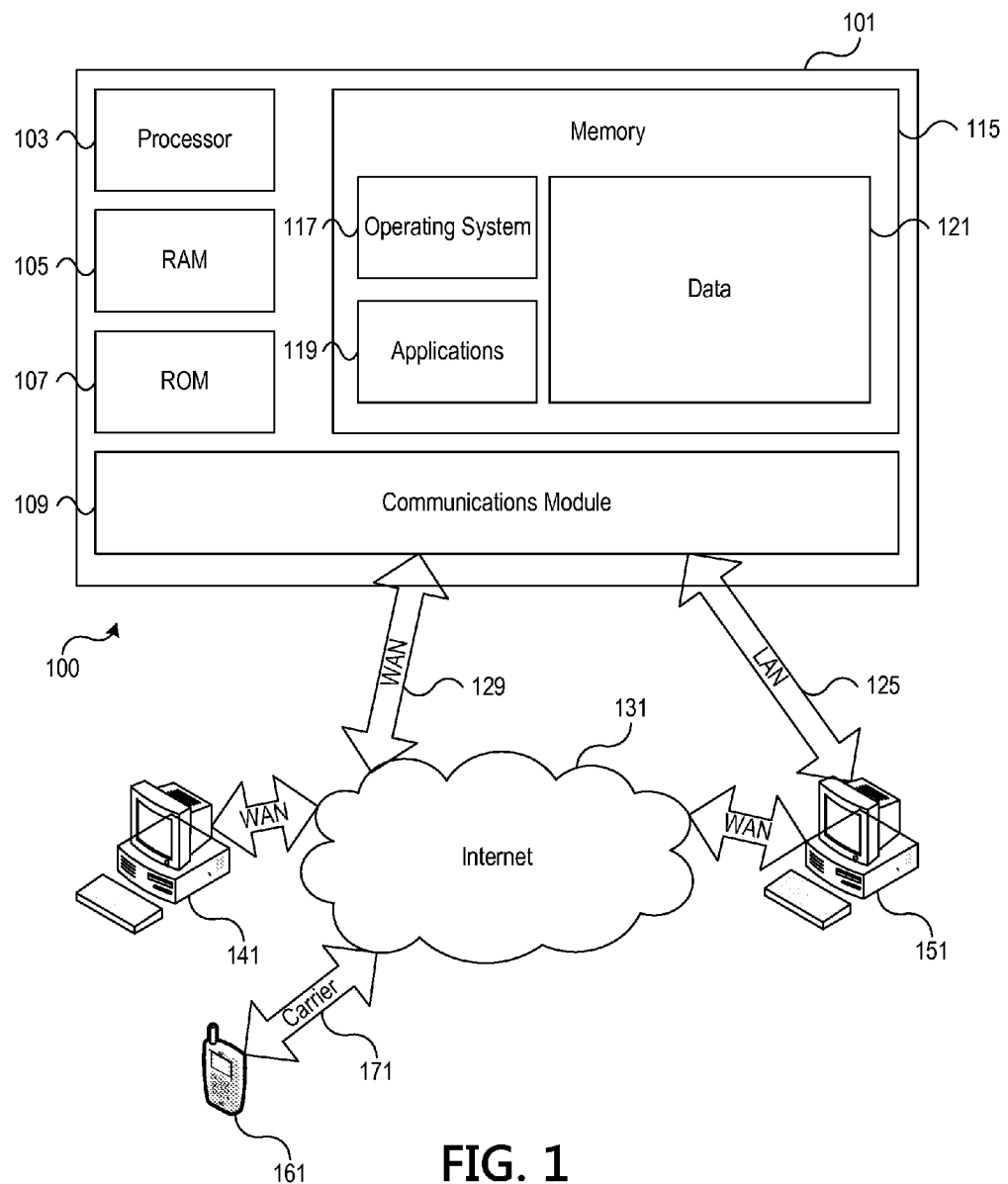
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
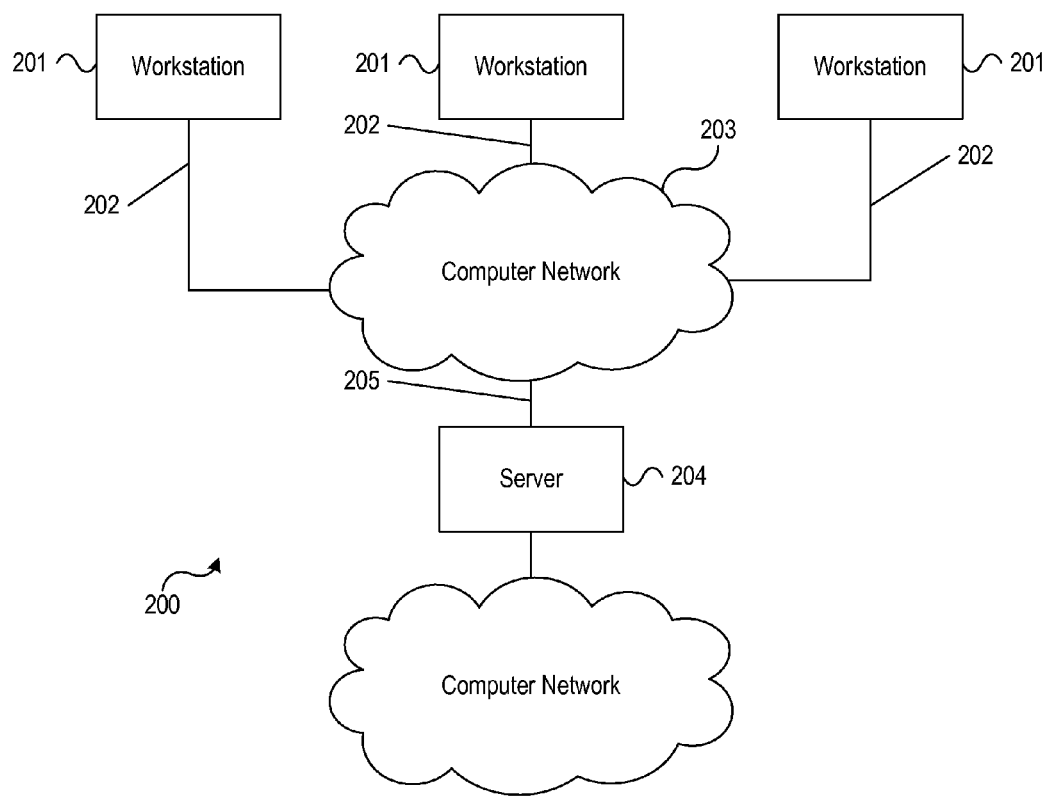
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
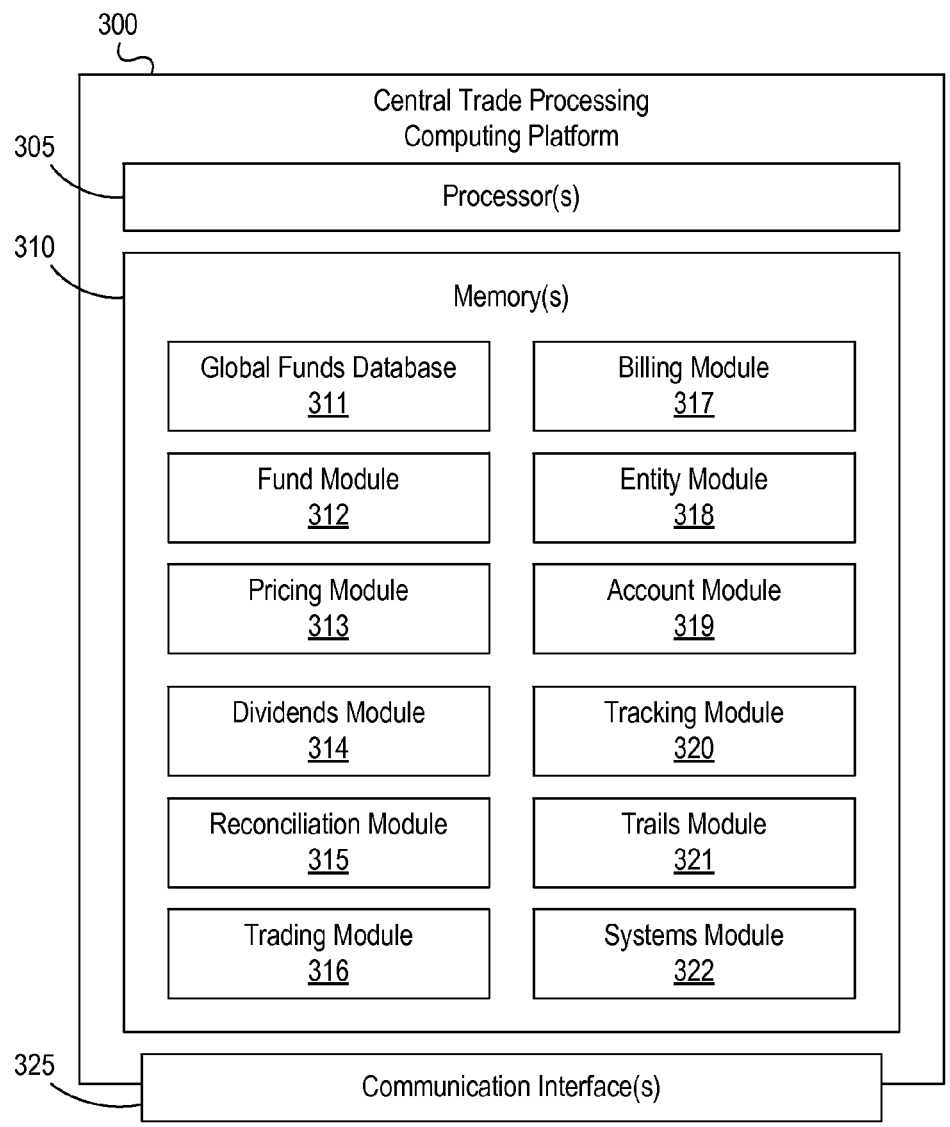
FIG. 3 depicts an illustrative computing platform for integrating multiple trading platforms with a central trade processing system in accordance with one or more example embodiments.

FIG. 3 depicts an illustrative computing platform for integrating multiple trading platforms with a central trade processing system in accordance with one or more example embodiments. Referring to FIG. 3, central trade processing computing platform 300 may include one or more processors 305, memory 310, and communication interface 325. A data bus may interconnect processor(s) 305, memory 310, and communication interface 325. Communication interface 325 may be a network interface configured to support communication between central trade processing computing platform 300 and one or more networks. Memory 310 may include one or more program modules having instructions that when executed by processor(s) 305 cause central trade processing computing platform 300 to perform one or more functions described herein and/or one or more databases that may store and/or otherwise maintain information which may be used by such program modules and/or processor(s) 305. In some instances, the one or more program modules and/or databases may be stored by and/or maintained in different memory units of central trade processing computing platform 300 and/or by different computer systems that may form and/or otherwise make up central trade processing computing platform 300.

For example, memory 310 may include a global funds database 311, which may store various types of information that may be used by central trade processing computing platform 300 for various purposes. For instance, global funds database 311 may store product information, rules information, and/or other information related to one or more mutual funds, one or more mutual fund derivatives, and/or other financial products that may be traded via one or more trading platforms that may be integrated with central trade processing computing platform 300, as illustrated in greater detail below. Memory 310 also may include a funds module 312 (which may, e.g., provide and/or perform one or more functions related to product setup, security information and processing rules, or the like). Memory 310 also may include a pricing module 313 (which may, e.g., provide and/or perform one or more functions related to fund pricing, dividend rates, or the like). Memory 310 also may include a dividends module 314 (which may, e.g., provide and/or perform one or more functions related to dividends, corrections, reinvestments, or the like). Memory 310 also may include a reconciliation module 315 (which may, e.g., provide and/or perform one or more functions related to reconciliation or the like). Memory 310 also may include trading module 316 (which may, e.g., provide and/or perform one or more functions related to product interfaces, trading interfaces, trade acceptance, trade placement, trade extension, trade corrections, trade settlement, or the like). Memory 310 also may include billing module 317 (which may, e.g., provide and/or perform one or more functions related to billing, monthly invoicing for fund groups, or the like). Memory 310 also may include entity module 318 (which may, e.g., provide and/or perform one or more functions related to entity interactions with one or more tracking systems or the like). Memory 310 also may include account module 319 (which may, e.g., provide and/or perform one or more functions related to account interactions with one or more trading interfaces and/or trading systems or the like). Memory 310 also may include tracking module 320 (which may, e.g., provide and/or perform one or more functions related to transaction and lot tracking, fee calculations, reconciliation, fractional processing, account maintenance, or the like). Memory 310 also may include trails module 321 (which may, e.g., provide and/or perform one or more functions related to monthly payments to financial advisors, monthly invoices to fund groups, or the like). Memory 310 also may include systems module 322 (which may, e.g., provide and/or perform one or more functions related to interacting with other internal systems to provide trades processing, accounts processing, stock records, corporate dividends, financial advisor compensation, or the like and/or one or more functions related to interacting with external systems to facilitate trade processing and/or execution, international placement and/or processor, or the like).

Figure 4:
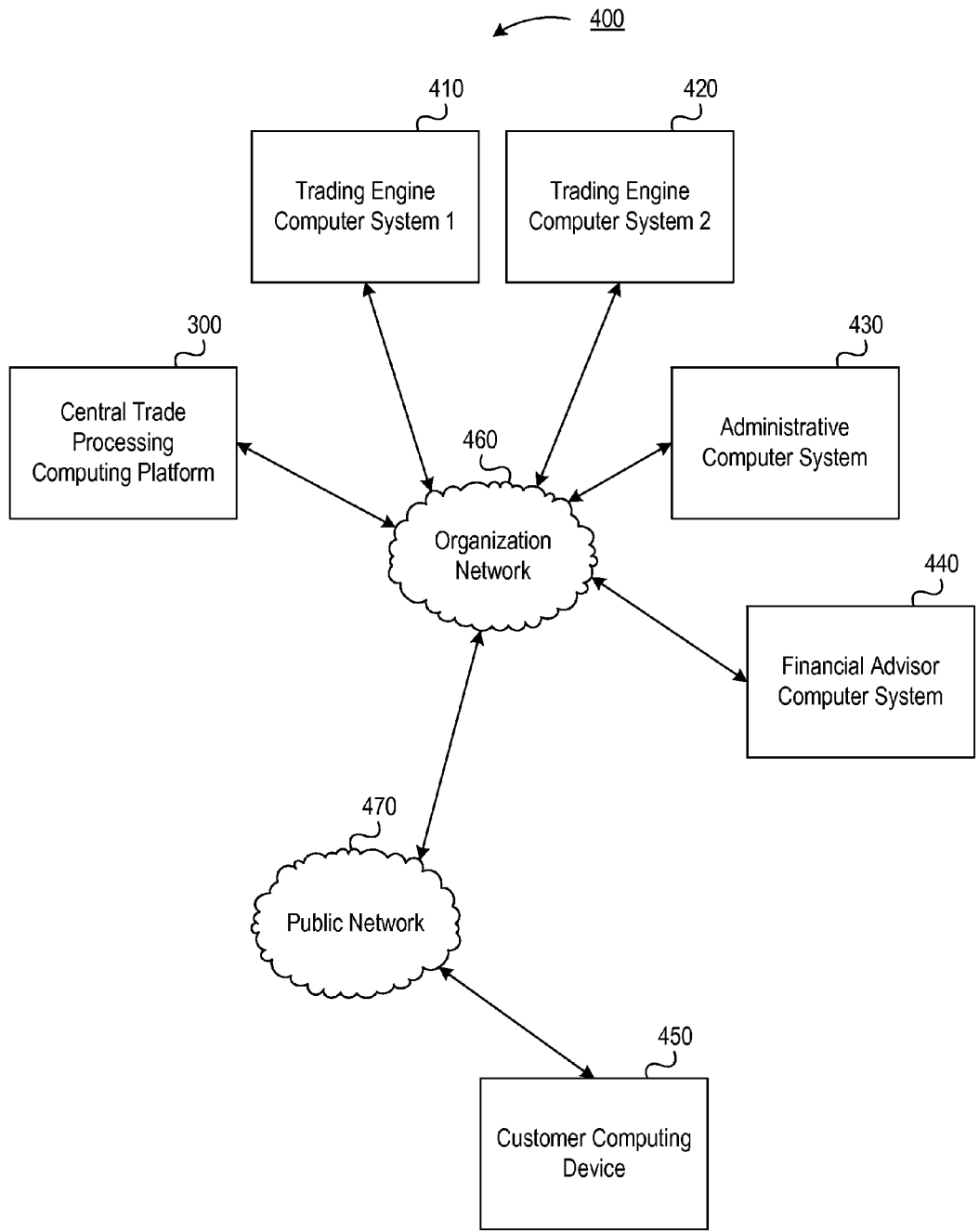
FIG. 4 depicts an illustrative computing environment for integrating multiple trading platforms with a central trade processing system in accordance with one or more example embodiments.

FIG. 4 depicts an illustrative computing environment for integrating multiple trading platforms with a central trade processing system in accordance with one or more example embodiments. Referring to FIG. 4, computing environment 400 may include one or more computing devices. For example, computing environment 400 may include a first trading engine computer system 410, a second trading engine computer system 420, an administrative computer system 430, a financial advisor computer system 440, and a customer computing device 450. Trading engine computer system 410 may provide a first trading platform and/or one or more associated trading interfaces via which one or more trades and/or other information may be entered, as illustrated in greater detail below. Trading engine computer system 420 may provide a second trading platform and/or one or more associated trading interfaces via which one or more trades and/or other information may be entered, as illustrated in greater detail below. Administrative computer system 430 may, for example, be used by and/or be configured to be used by an administrative user of an organization, such as an administrative user of a financial institution and/or an administrative user of a particular business unit of a financial institution. Financial advisor computer system 440 may, for example, be used by and/or be configured to be used by a financial advisor of an organization, such as a financial institution. Customer computing device 450 may, for example, be used by and/or be configured to be used by a customer of an organization, such as a customer of the financial institution.

In one or more arrangements, trading engine computer system 410, trading engine computer system 420, administrative computer system 430, financial advisor computer system 440, and customer computing device 450 may be any type of computing device capable of receiving a user interface, receiving input via the user interface, and communicating the received input to one or more other computing devices. For example, trading engine computer system 410, trading engine computer system 420, administrative computer system 430, financial advisor computer system 440, and customer computing device 450 may, in some instances, be and/or include server computers, desktop computers, laptop computers, tablet computers, smart phones, or the like. As noted above, and as illustrated in greater detail below, any and/or all of trading engine computer system 410, trading engine computer system 420, administrative computer system 430, financial advisor computer system 440, and customer computing device 450 may, in some instances, be special-purpose computing devices configured to perform specific functions.

Computing environment 400 also may include one or more computing platforms. For example, computing environment 400 may include central trade processing computing platform 300. As illustrated above, central trade processing computing platform 300 may include one or more computing devices configured to perform one or more of the functions described herein. For example, central trade processing computing platform 300 may include one or more computers (e.g., laptop computers, desktop computers, servers, server blades, or the like).

Computing environment 400 also may include one or more networks, which may interconnect one or more of central trade processing computing platform 300, trading engine computer system 410, trading engine computer system 420, administrative computer system 430, financial advisor computer system 440, and customer computing device 450. For example, computing environment 400 may include organization network 460 and public network 470. Organization network 460 and/or public network 470 may include one or more sub-networks (e.g., LANs, WANs, or the like). Organization network 460 may be associated with a particular organization (e.g., a corporation, financial institution, educational institution, governmental institution, or the like) and may interconnect one or more computing devices associated with the organization. For example, central trade processing computing platform 300, trading engine computer system 410, trading engine computer system 420, administrative computer system 430, and financial advisor computer system 440 may be associated with an organization (e.g., a financial institution), and organization network 460 may be associated with and/or operated by the organization, and may include one or more networks (e.g., LANs, WANs, VPNs, or the like) that interconnect central trade processing computing platform 300, trading engine computer system 410, trading engine computer system 420, administrative computer system 430, and financial advisor computer system 440 and one or more other computing devices and/or computer systems that are used by, operated by, and/or otherwise associated with the organization. Public network 470 may connect organization network 460 and/or one or more computing devices connected thereto (e.g., central trade processing computing platform 300, trading engine computer system 410, trading engine computer system 420, administrative computer system 430, and financial advisor computer system 440) with one or more networks and/or computing devices that are not associated with the organization. For example, customer computing device 450 might not be associated with an organization that operates organization network 460 (e.g., because customer computing device 450 may be owned and/or operated by one or more entities different from the organization that operates organization network 460, such as one or more customers of the organization, rather than being owned and/or operated by the organization itself or an employee or affiliate of the organization), and public network 470 may include one or more networks (e.g., the internet) that connect customer computing device 450 to organization network 460 and/or one or more computing devices connected thereto (e.g., central trade processing computing platform 300, trading engine computer system 410, trading engine computer system 420, administrative computer system 430, and financial advisor computer system 440).

Figure 5A:
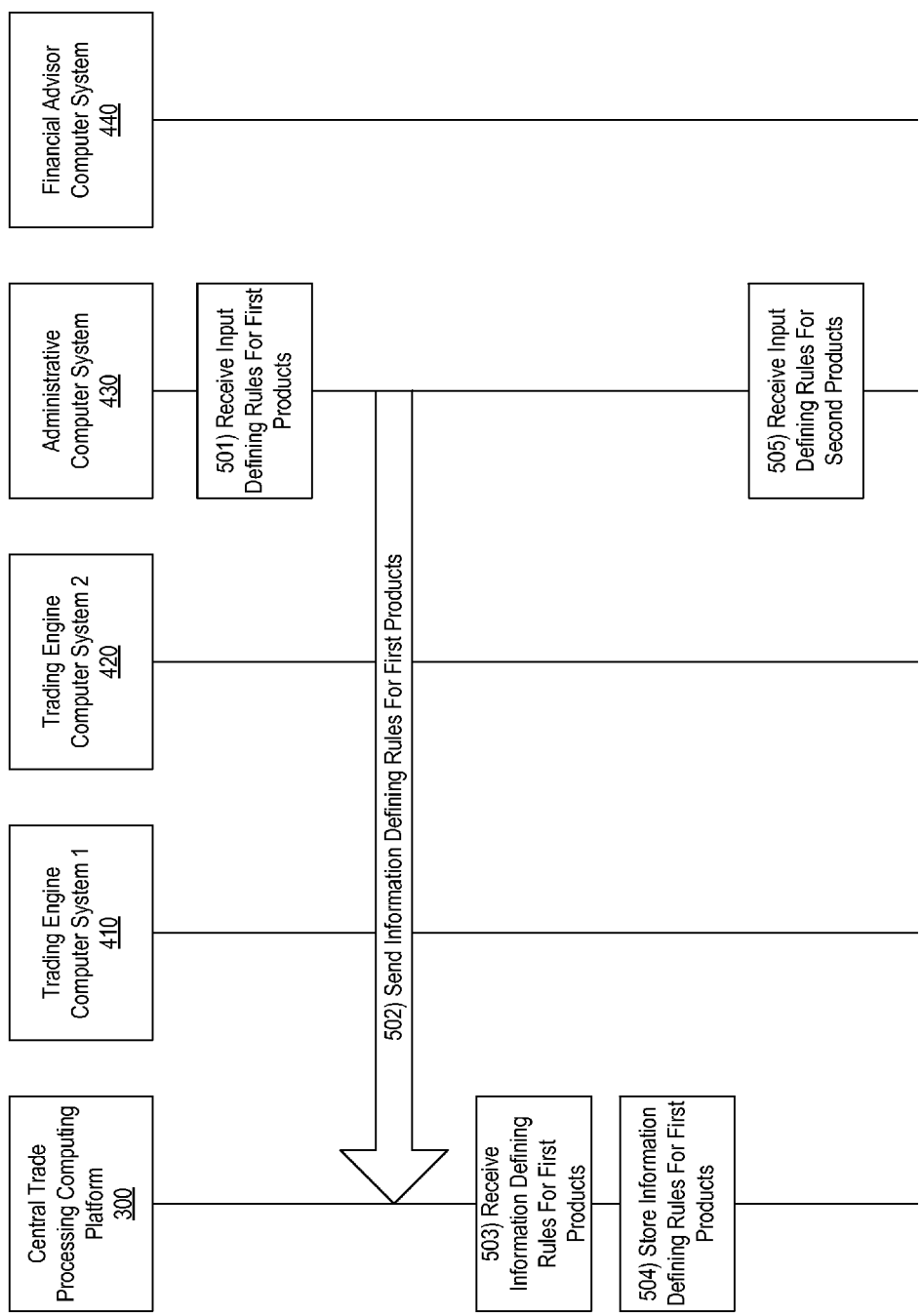
FIGS. 5A-5M depict an illustrative event sequence for integrating multiple trading platforms with a central trade processing system in accordance with one or more example embodiments.

FIGS. 5A-5M depict an illustrative event sequence for integrating multiple trading platforms with a central trade processing system in accordance with one or more example embodiments. Referring to FIG. 5A, at step 501, administrative computer system 430 may receive input defining one or more rules for a first set of products (which may, e.g., include one or more financial products, such as one or more mutual funds, mutual fund derivatives, or the like). At step 502, administrative computer system 430 may send information defining the one or more rules for the first set of products to central trade processing computing platform 300 (e.g., based on the input received by administrative computer system 430 at step 501). At step 503, central trade processing computing platform 300 may receive the information defining the one or more rules for the first set of products from administrative computer system 430. For example, at step 503, central trade processing computing platform 300 may receive, via a communication interface (e.g., communication interface 325), and from an administrative computer system (e.g., administrative computer system 430), first product rules information defining one or more rules for trading in a first set of one or more financial products offered via a first trading interface provided by a first trading engine computer system (e.g., trading engine computer system 410). At step 504, central trade processing computing platform 300 may store the information defining the one or more rules for the first set of products received from administrative computer system 430. For example, at step 504, central trade processing computing platform 300 may store, in a global funds database maintained by central trade processing computing platform 300 (e.g., global funds database 311), the first product rules information defining the one or more rules for trading in the first set of one or more financial products offered via the first trading interface provided by the first trading engine computer system (e.g., trading engine computer system 410).

Figure 5B:
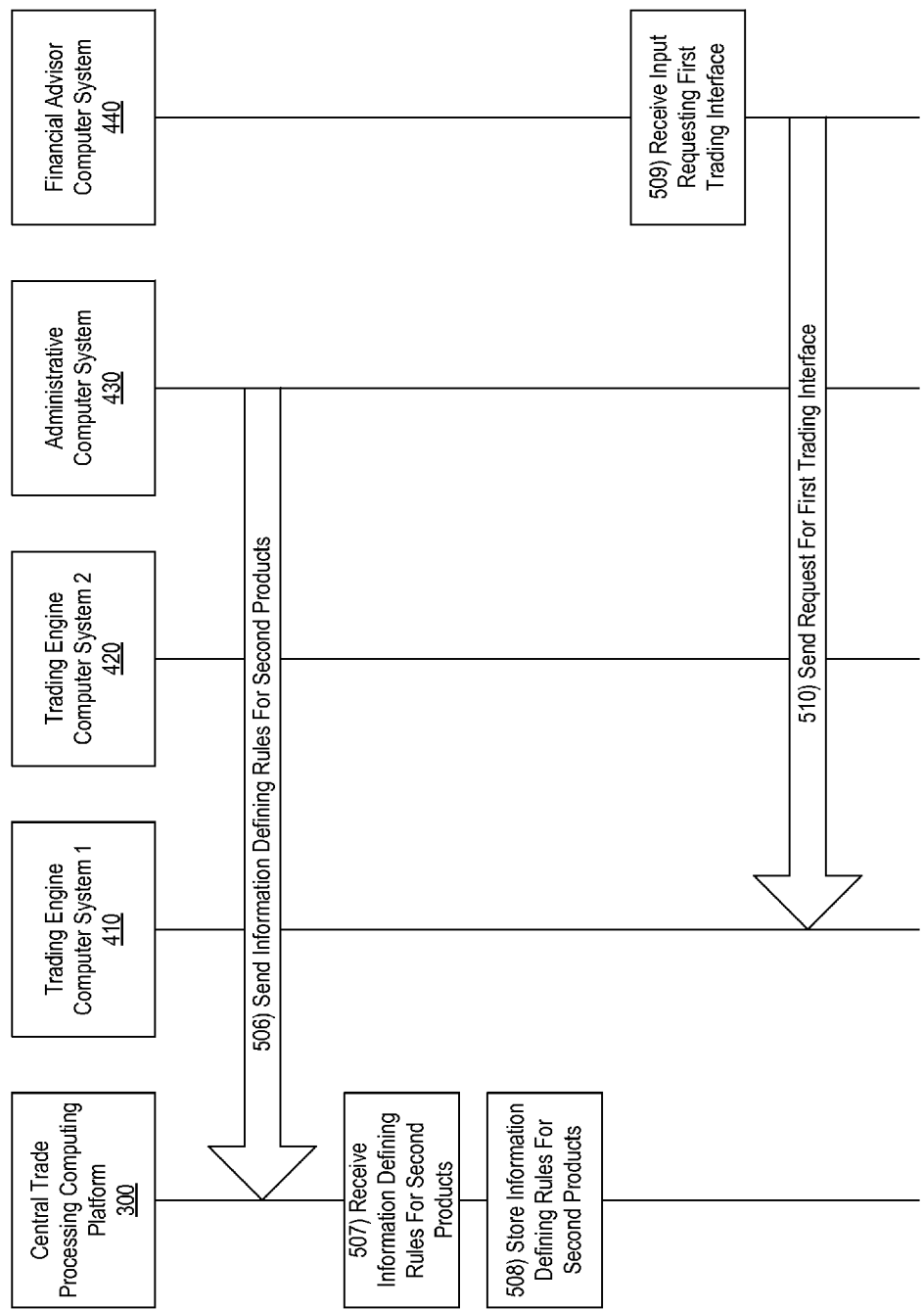

At step 505, administrative computer system 430 may receive input defining one or more rules for a second set of products (which may, e.g., include one or more financial products, such as one or more mutual funds, mutual fund derivatives, or the like). Referring to FIG. 5B, at step 506, administrative computer system 430 may send information defining the one or more rules for the second set of products to central trade processing computing platform 300 (e.g., based on the input received by administrative computer system 430 at step 505). At step 507, central trade processing computing platform 300 may receive the information defining the one or more rules for the second set of products from administrative computer system 430. For example, at step 507, central trade processing computing platform 300 may receive, via the communication interface (e.g., communication interface 325), and from the administrative computer system (e.g., administrative computer system 430), second product rules information defining one or more rules for trading in a second set of one or more financial products offered via a second trading interface provided by a second trading engine computer system (e.g., trading engine computer system 420). At step 508, central trade processing computing platform 300 may store the information defining the one or more rules for the second set of products received from administrative computer system 430. For example, at step 508, central trade processing computing platform 300 may store, in the global funds database maintained by central trade processing computing platform 300 (e.g., global funds database 311), the second product rules information defining the one or more rules for trading in the second set of one or more financial products offered via the second trading interface provided by the second trading engine computer system (e.g., trading engine computer system 420).

Figure 5C:
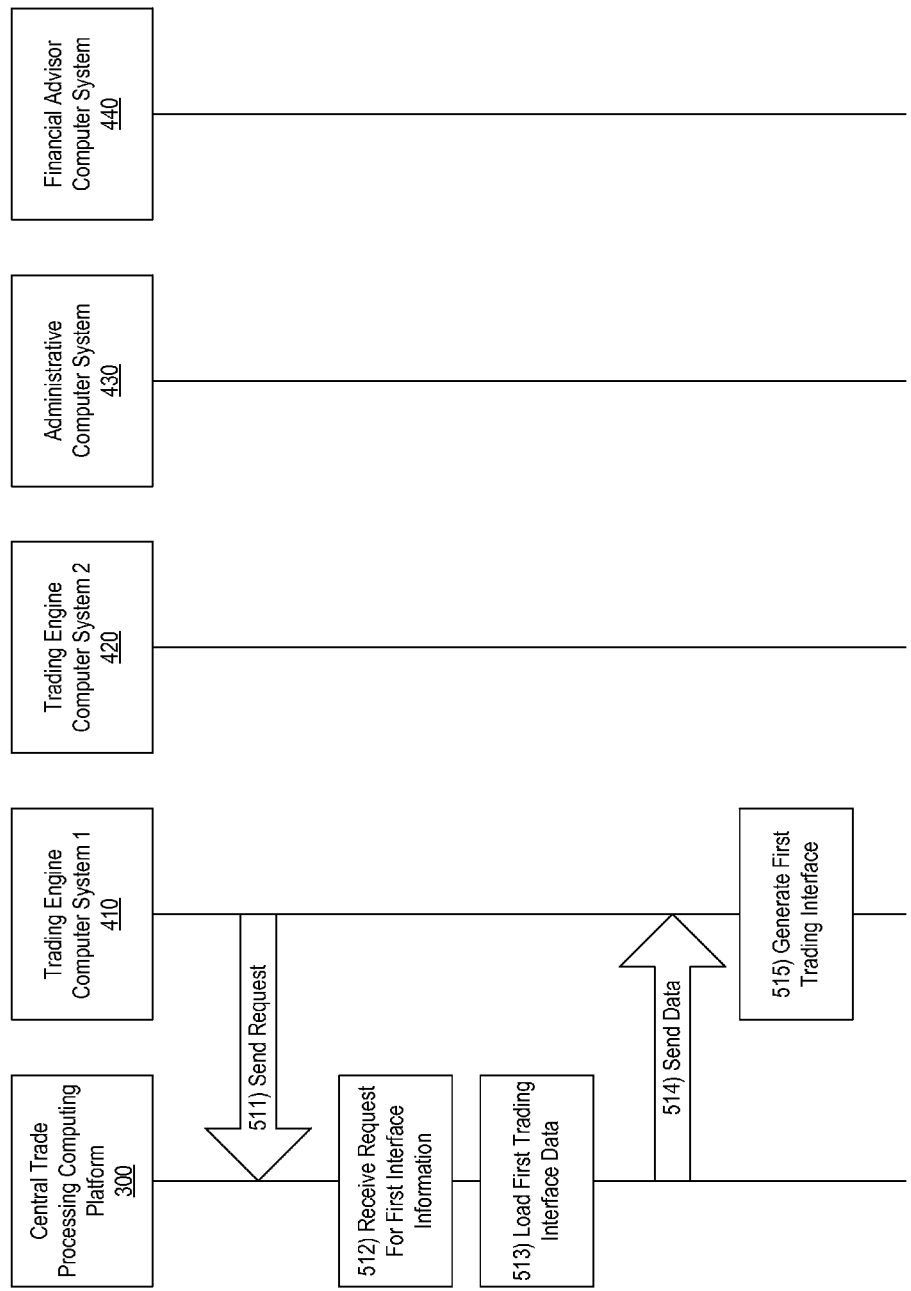

At step 509, financial advisor computer system 440 may receive input requesting a first trading interface (which may, e.g., enable a user of financial advisor computer system 440 to trade in a first set of financial products, such as one or more mutual funds, mutual fund derivatives, or the like). At step 510, financial advisor computer system 440 may send a request for the first trading interface to trading engine computer system 410. Referring to FIG. 5C, at step 511, trading engine computer system 410 may send a request for first interface information to central trade processing computing platform 300 (e.g., based on the request received from financial advisor computer system 440 at step 510). Such a request (which may, e.g., be sent by trading engine computer system 410 to central trade processing computing platform 300 at step 511) may, for instance, include information requesting up-to-date product information, rules information, interface layout information, and/or other information that may affect a trading interface provided by trading engine computer system 410 (e.g., to financial advisor computer system 440).

At step 512, central trade processing computing platform 300 may receive the request for first interface information from trading engine computer system 410. For example, at step 512, central trade processing computing platform 300 may receive, via the communication interface (e.g., communication interface 325), and from a first trading engine computer system (e.g., trading engine computer system 410), a first request for first interface information. At step 513, central trade processing computing platform 300 may load first trading interface data (e.g., based on the request for first interface information received from trading engine computer system 410 at step 512). For example, at step 513, based on receiving the first request for the first interface information from the first trading engine computer system, central trade processing computing platform 300 may load first trading interface data, and the first trading interface data may include first product information associated with a first set of one or more financial products offered via a first trading interface provided by the first trading engine computer system (e.g., trading engine computer system 410) and first interface layout information associated with the first trading interface provided by the first trading engine computer system (e.g., trading engine computer system 410).

In some embodiments, the first product information associated with the first set of one or more financial products offered via the first trading interface provided by the first trading engine computer system may include first product rules information defining one or more rules for trading in the first set of one or more financial products offered via the first trading interface provided by the first trading engine computer system. For example, the first product information included in the first trading interface data loaded by central trade processing computing platform 300 at step 513 and associated with the first set of one or more financial products offered via the first trading interface provided by the first trading engine computer system (e.g., trading engine computer system 410) may include first product rules information defining one or more rules for trading in the first set of one or more financial products offered via the first trading interface provided by the first trading engine computer system (e.g., trading engine computer system 410).

Figure 5D:
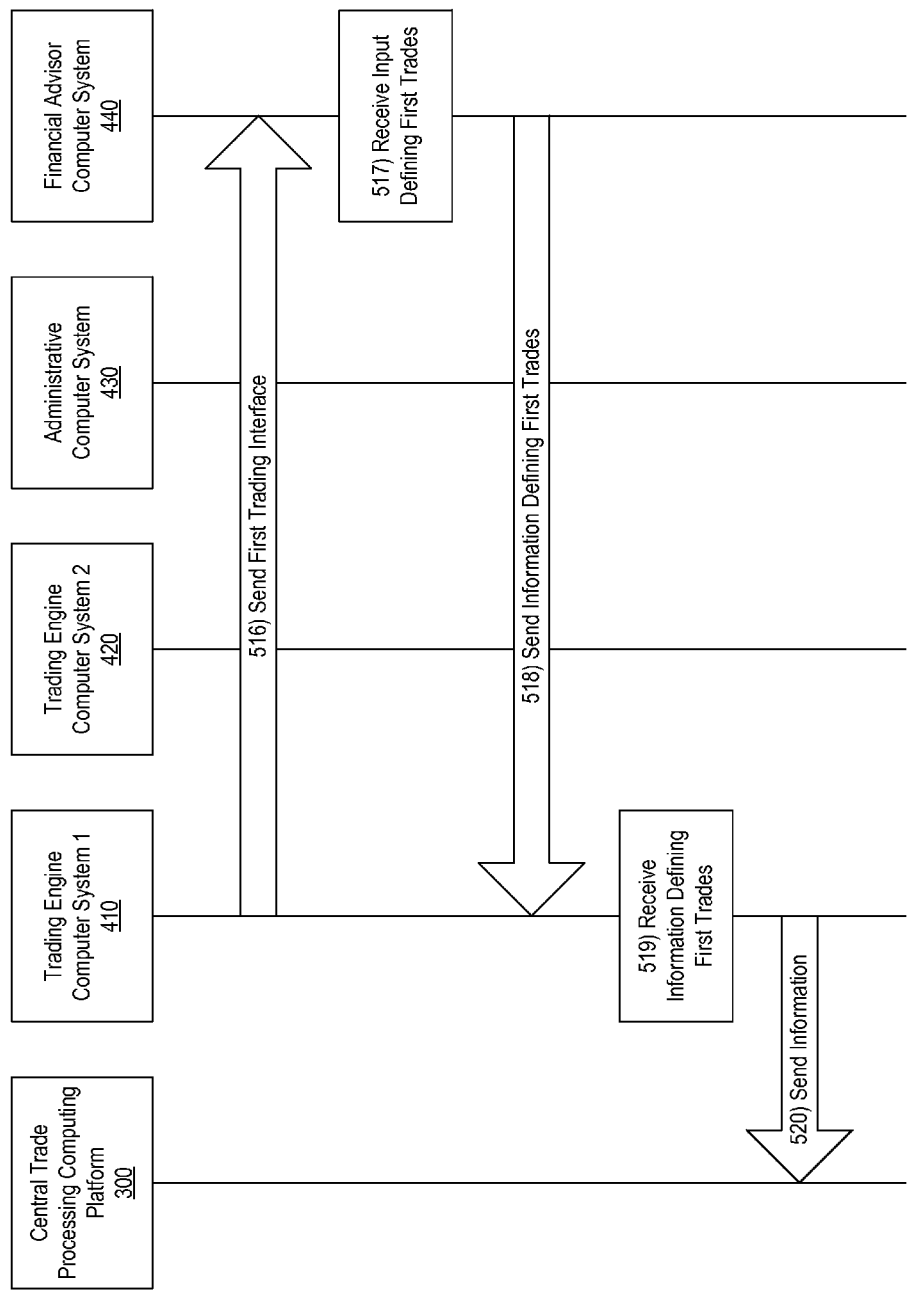

At step 514, central trade processing computing platform 300 may send the first trading interface data to trading engine computer system 410. For example, at step 514, central trade processing computing platform 300 may send, via the communication interface (e.g., communication interface 325), and to the first trading engine computer system (e.g., trading engine computer system 410), the first trading interface data. At step 515, trading engine computer system 410 may generate a first trading interface based on the first trading interface data received from central trade processing computing platform 300. Referring to FIG. 5D, at step 516, trading engine computer system 410 may send and/or otherwise provide the first trading interface to financial advisor computer system 440.

At step 517, financial advisor computer system 440 may receive input defining a first set of trades via the first trading interface. At step 518, financial advisor computer system 440 may send information defining the first set of trades to trading engine computer system 410. At step 519, trading engine computer system 410 may receive the information defining the first set of trades from financial advisor computer system 440. At step 520, trading engine computer system 410 may send the information defining the first set of trades to central trade processing computing platform 300.

Figure 5E:
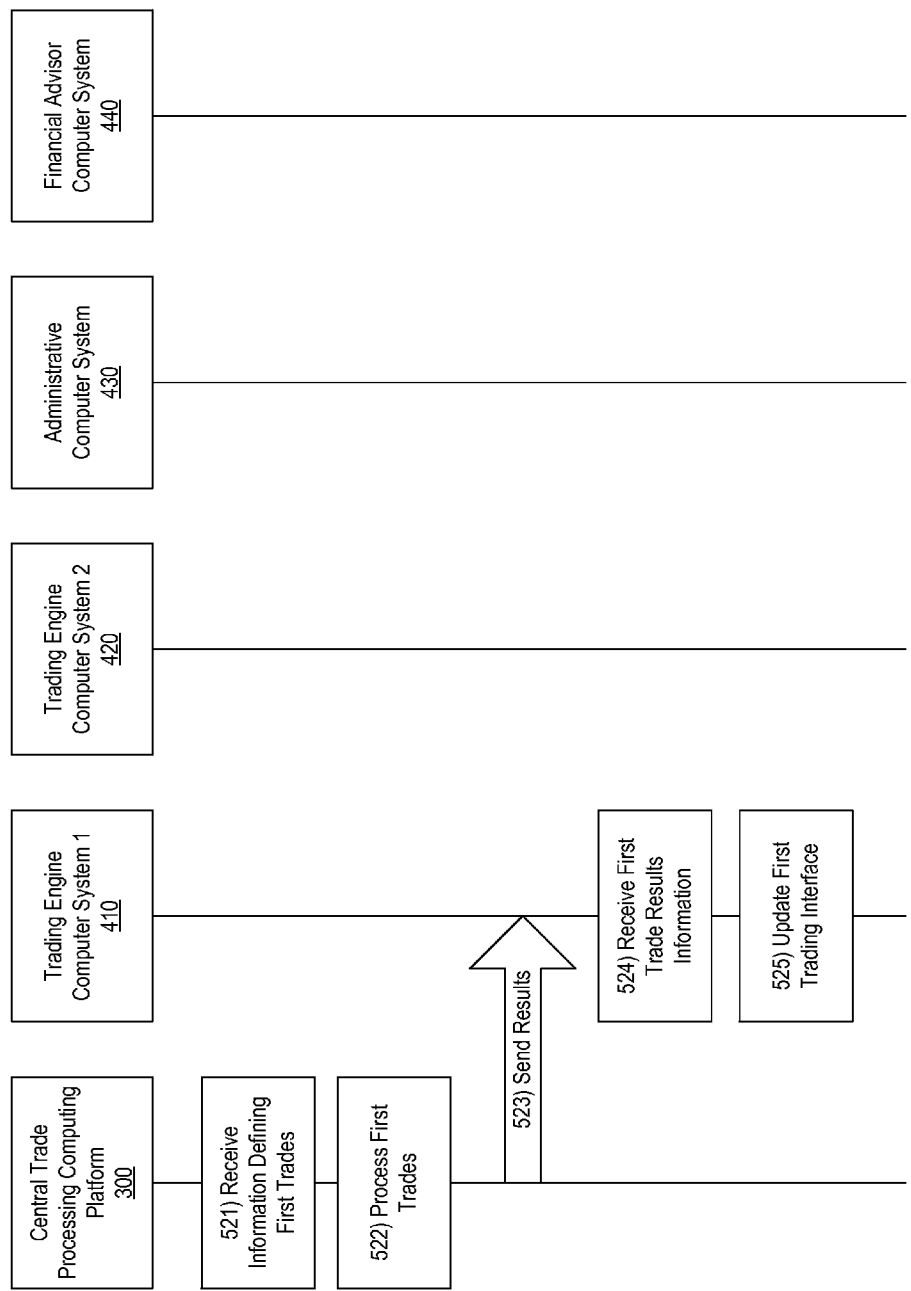

Referring to FIG. 5E, at step 521, central trade processing computing platform 300 may receive the information defining the first set of trades from trading engine computer system 410. For example, at step 521, central trade processing computing platform 300 may receive, via the communication interface (e.g., communication interface 325), and from the first trading engine computer system (e.g., trading engine computer system 410), first trading information defining a first set of one or more trades associated with the first set of one or more financial products offered via the first trading interface provided by the first trading engine computer system (e.g., trading engine computer system 410).

In some embodiments, the first set of one or more trades associated with the first set of one or more financial products offered via the first trading interface provided by the first trading engine computer system may include at least one trade associated with at least one mutual fund. For example, the first set of one or more trades defined by the first trading information received by central trade processing computing platform 300 at step 521 and associated with the first set of one or more financial products offered via the first trading interface provided by the first trading engine computer system (e.g., trading engine computer system 410) may include at least one trade associated with at least one mutual fund (e.g., one or more trades, such as one or more buy trades, sell trades, and/or other trades that involve and/or are otherwise associated with one or more mutual fund securities).

In some embodiments, the first set of one or more trades associated with the first set of one or more financial products offered via the first trading interface provided by the first trading engine computer system may include at least one trade associated with at least one mutual fund derivative. For example, the first set of one or more trades defined by the first trading information received by central trade processing computing platform 300 at step 521 and associated with the first set of one or more financial products offered via the first trading interface provided by the first trading engine computer system (e.g., trading engine computer system 410) may include at least one trade associated with at least one mutual fund derivative (e.g., one or more trades, such as one or more buy trades, sell trades, and/or other trades that involve and/or are otherwise associated with one or more mutual fund derivatives, such as hedge items, private equity items, managed futures, commodities, physicals, stable value items, collective trust items, and/or other securities which may share one or more properties of mutual funds and which thus may be considered mutual fund derivatives).

At step 522, central trade processing computing platform 300 may process the first set of trades. For example, at step 522, based on the first trading information defining the first set of one or more trades received from the first trading engine computer system (e.g., trading engine computer system 410), central trade processing computing platform 300 may process the first set of one or more trades associated with the first set of one or more financial products offered via the first trading interface provided by the first trading engine computer system (e.g., trading engine computer system 410). In processing the first set of one or more trades associated with the first set of one or more financial products offered via the first trading interface provided by the first trading engine computer system (e.g., trading engine computer system 410), central trade processing computing platform 300 may, for instance, validate the one or more trades based on one or more product rules and/or processing rules and/or other rules, place and/or execute the one or more trades, track the one or more trades, generate reconciliation information and/or trails information, and/or otherwise process the one or more trades in real-time as they are received from trading engine computer system 410 (e.g., rather than processing the one or more trades with other trades in a daily batch or other periodically processed batch).

At step 523, central trade processing computing platform 300 may send first trade results information to trading engine computer system 410 (e.g., based on the processing performed by central trade processing computing platform 300 at step 522). For example, at step 523, based on processing the first set of one or more trades associated with the first set of one or more financial products offered via the first trading interface provided by the first trading engine computer system (e.g., trading engine computer system 410), central trade processing computing platform 300 may send, via the communication interface (e.g., communication interface 325), and to the first trading engine computer system (e.g., trading engine computer system 410), first trade results information. Such first trade results information may, for example, be generated by central trade processing computing platform 300 as and/or after the one or more trades included in the first set of one or more trades are processed in real-time or near real-time by central trade processing computing platform 300, as discussed above.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is valid and pending execution. For example, the first trade results information sent to the first trading engine computer system (e.g., trading engine computer system 410) by central trade processing computing platform 300 at step 523 may include results data configured to cause the first trading engine computer system (e.g., trading engine computer system 410) to present a notification indicating that at least one trade of the first set of one or more trades associated with the first set of one or more financial products offered via the first trading interface provided by the first trading engine computer system (e.g., trading engine computer system 410) is valid and pending execution.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is valid and has been executed. For example, the first trade results information sent to the first trading engine computer system (e.g., trading engine computer system 410) by central trade processing computing platform 300 at step 523 may include results data configured to cause the first trading engine computer system (e.g., trading engine computer system 410) to present a notification indicating that at least one trade of the first set of one or more trades associated with the first set of one or more financial products offered via the first trading interface provided by the first trading engine computer system (e.g., trading engine computer system 410) is valid and has been executed.

In some embodiments, the first trade results information sent to the first trading engine computer system may include results data configured to cause the first trading engine computer system to present a notification indicating that at least one trade of the first set of one or more trades associated with the first set of one or more financial products offered via the first trading interface provided by the first trading engine computer system is invalid and will not be executed. For example, the first trade results information sent to the first trading engine computer system (e.g., trading engine computer system 410) by central trade processing computing platform 300 at step 523 may include results data configured to cause the first trading engine computer system (e.g., trading engine computer system 410) to present a notification indicating that at least one trade of the first set of one or more trades associated with the first set of one or more financial products offered via the first trading interface provided by the first trading engine computer system (e.g., trading engine computer system 410) is invalid and will not be executed (e.g., because the at least one trade includes one or more errors, such as one or more violations of one or more applicable product rules, program rules, account rules, or the like).

Figure 5F:
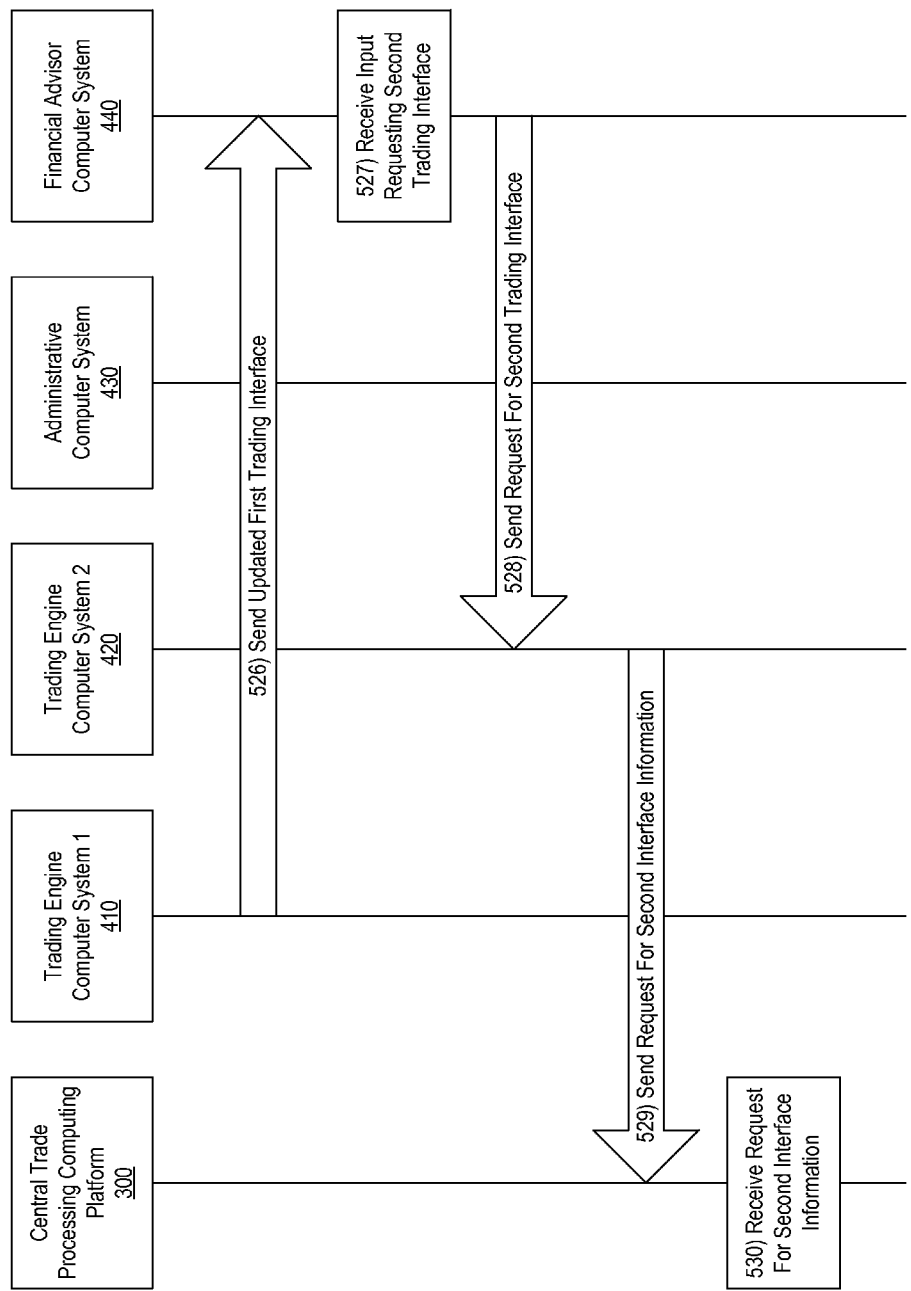

At step 524, trading engine computer system 410 may receive the first trade results information from central trade processing computing platform 300. At step 525, trading engine computer system 410 may update the first trading interface based on the first trade results information received from central trade processing computing platform 300. Referring to FIG. 5F, at step 526, trading engine computer system 410 may send and/or otherwise provide the updated first trading interface to financial advisor computer system 440.

At step 527, financial advisor computer system 440 may receive input requesting a second trading interface (which may, e.g., enable a user of financial advisor computer system 440 to trade in a second set of financial products, such as one or more mutual funds, mutual fund derivatives, or the like, different from the first set of financial products). At step 528, financial advisor computer system 440 may send a request for the second trading interface to trading engine computer system 420. At step 529, trading engine computer system 420 may send a request for second interface information to central trade processing computing platform 300 (e.g., based on the request received from financial advisor computer system 440 at step 528). Such a request (which may, e.g., be sent by trading engine computer system 420 to central trade processing computing platform 300 at step 529) may, for instance, include information requesting up-to-date product information, rules information, interface layout information, and/or other information that may affect a trading interface provided by trading engine computer system 420 (e.g., to financial advisor computer system 440).

Figure 5G:
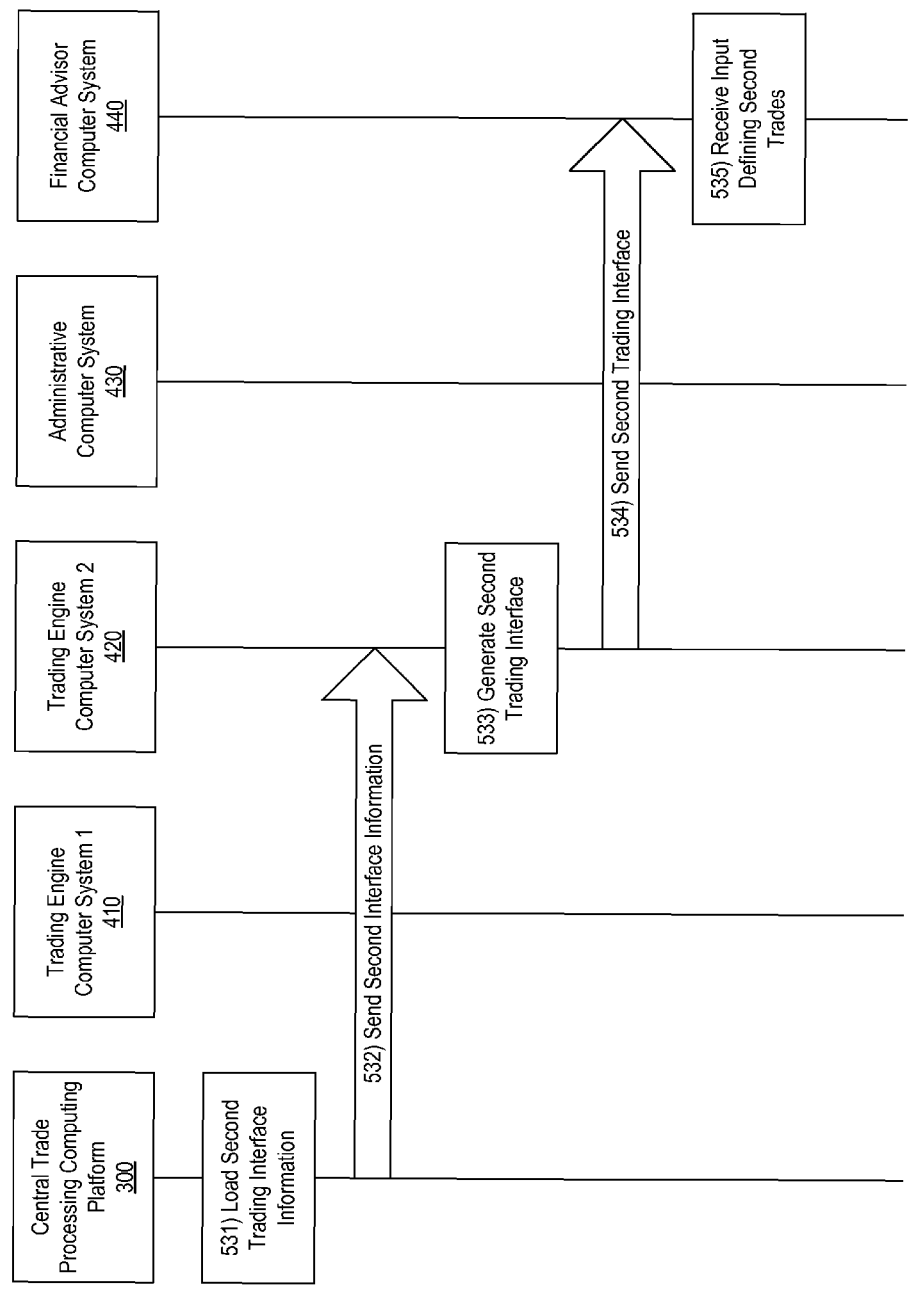

At step 530, central trade processing computing platform 300 may receive the request for second interface information from trading engine computer system 420. For example, at step 530, central trade processing computing platform 300 may receive, via the communication interface (e.g., communication interface 325), and from a second trading engine computer system (e.g., trading engine computer system 420) different from the first trading engine computer system (e.g., trading engine computer system 410), a second request for second interface information. Referring to FIG. 5G, at step 531, central trade processing computing platform 300 may load second trading interface data (e.g., based on the request for second interface information received from trading engine computer system 420 at step 530). For example, at step 531, based on receiving the second request for the second interface information from the second trading engine computer system (e.g., trading engine computer system 420), central trade processing computing platform 300 may load second trading interface data different from the first trading interface data, and the second trading interface data may include second product information associated with a second set of one or more financial products offered via a second trading interface provided by the second trading engine computer system (e.g., trading engine computer system 420) and second interface layout information associated with the second trading interface provided by the second trading engine computer system (e.g., trading engine computer system 420). At step 532, central trade processing computing platform 300 may send the second trading interface data to trading engine computer system 420. For example, at step 532, central trade processing computing platform 300 may send, via the communication interface (e.g., communication interface 325), and to the second trading engine computer system (e.g., trading engine computer system 420), the second trading interface data.

In some embodiments, the first trading interface data sent to the first trading engine computer system may be configured to cause the first trading engine computer system to present a financial-advisor-facing trading interface, and the second trading interface data sent to the second trading engine computer system may be configured to cause the second trading engine computer system to present a customer-facing trading interface. For example, the first trading interface data sent by central trade processing computing platform 300 to the first trading engine computer system (e.g., trading engine computer system 410) may be configured to cause the first trading engine computer system (e.g., trading engine computer system 410) to present a financial-advisor-facing trading interface, while the second trading interface data sent by central trade processing computing platform 300 to the second trading engine computer system (e.g., trading engine computer system 420) may be configured to cause the second trading engine computer system (e.g., trading engine computer system 420) to present a customer-facing trading interface. For instance, the first trading interface may be a financial-advisor-facing trading interface, such as a managed account trading interface, a private client order entry trading interface, a financial advisor discretionary trading interface, a tri-party trading interface, or the like, and the second trading interface may be a customer-facing trading interface, such as a retirement trading interface, a 401(k) trading interface, a college savings trading interface, a retail brokerage trading interface, or the like.

Figure 5H:
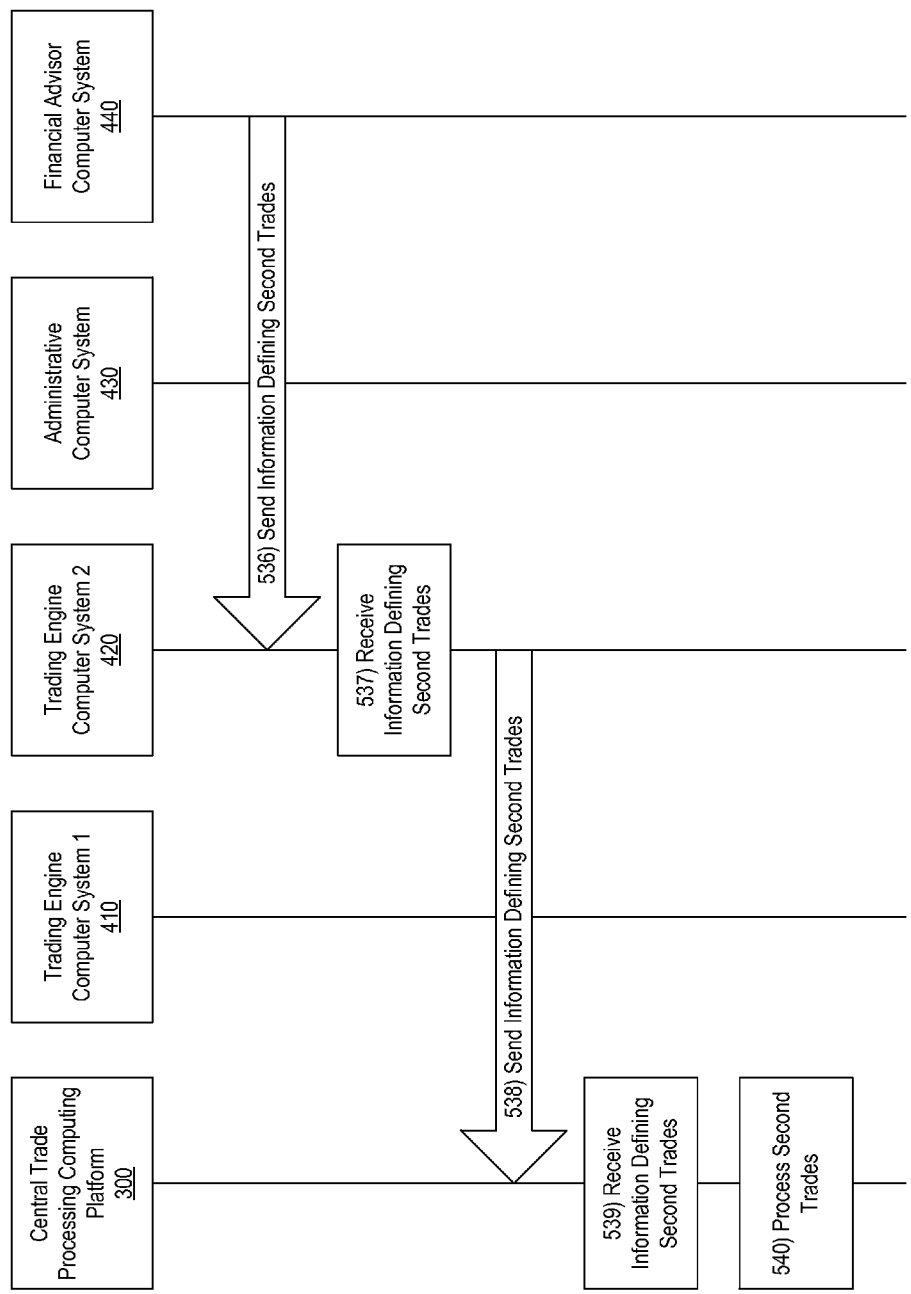

At step 533, trading engine computer system 420 may generate a second trading interface based on the second trading interface data received from central trade processing computing platform 300. At step 534, trading engine computer system 420 may send and/or otherwise provide the second trading interface to financial advisor computer system 440. At step 535, financial advisor computer system 440 may receive input defining a second set of trades via the second trading interface. Referring to FIG. 5H, at step 536, financial advisor computer system 440 may send information defining the second set of trades to trading engine computer system 420. At step 537, trading engine computer system 420 may receive the information defining the second set of trades from financial advisor computer system 440. At step 538, trading engine computer system 420 may send the information defining the second set of trades to central trade processing computing platform 300.

At step 539, central trade processing computing platform 300 may receive the information defining the second set of trades from trading engine computer system 420. For example, at step 539, central trade processing computing platform 300 may receive, via the communication interface (e.g., communication interface 325), and from the second trading engine computer system (e.g., trading engine computer system 420), second trading information defining a second set of one or more trades associated with the second set of one or more financial products offered via the second trading interface provided by the second trading engine computer system (e.g., trading engine computer system 420).

In some embodiments, the second set of one or more trades associated with the second set of one or more financial products offered via the second trading interface provided by the second trading engine computer system may include at least one trade associated with at least one mutual fund. For example, the second set of one or more trades received by central trade processing computing platform 300 at step 539 and associated with the second set of one or more financial products offered via the second trading interface provided by the second trading engine computer system (e.g., trading engine computer system 420) may include at least one trade associated with at least one mutual fund (e.g., one or more trades, such as one or more buy trades, sell trades, and/or other trades that involve and/or are otherwise associated with one or more mutual fund securities).

In some embodiments, the second set of one or more trades associated with the second set of one or more financial products offered via the second trading interface provided by the second trading engine computer system may include at least one trade associated with at least one mutual fund derivative. For example, the second set of one or more trades received by central trade processing computing platform 300 at step 539 and associated with the second set of one or more financial products offered via the second trading interface provided by the second trading engine computer system (e.g., trading engine computer system 420) may include at least one trade associated with at least one mutual fund derivative (e.g., one or more trades, such as one or more buy trades, sell trades, and/or other trades that involve and/or are otherwise associated with one or more mutual fund derivatives, such as hedge items, private equity items, managed futures, commodities, physicals, stable value items, collective trust items, and/or other securities which may share one or more properties of mutual funds and which thus may be considered mutual fund derivatives).

At step 540, central trade processing computing platform 300 may process the second set of trades (e.g., similar to how central trade processing computing platform 300 may process the first set of trades at step 522). For example, at step 540, based on the second trading information defining the second set of one or more trades received from the second trading engine computer system (e.g., trading engine computer system 420), central trade processing computing platform 300 may process the second set of one or more trades associated with the second set of one or more financial products offered via the second trading interface provided by the second trading engine computer system (e.g., trading engine computer system 420). In processing the second set of one or more trades associated with the second set of one or more financial products offered via the second trading interface provided by the second trading engine computer system (e.g., trading engine computer system 420), central trade processing computing platform 300 may, for instance, validate the one or more trades based on one or more product rules and/or processing rules and/or other rules, place and/or execute the one or more trades, track the one or more trades, generate reconciliation information and/or trails information, and/or otherwise process the one or more trades in real-time as they are received from trading engine computer system 420 (e.g., rather than processing the one or more trades with other trades in a daily batch or other periodically processed batch).

Figure 5I:
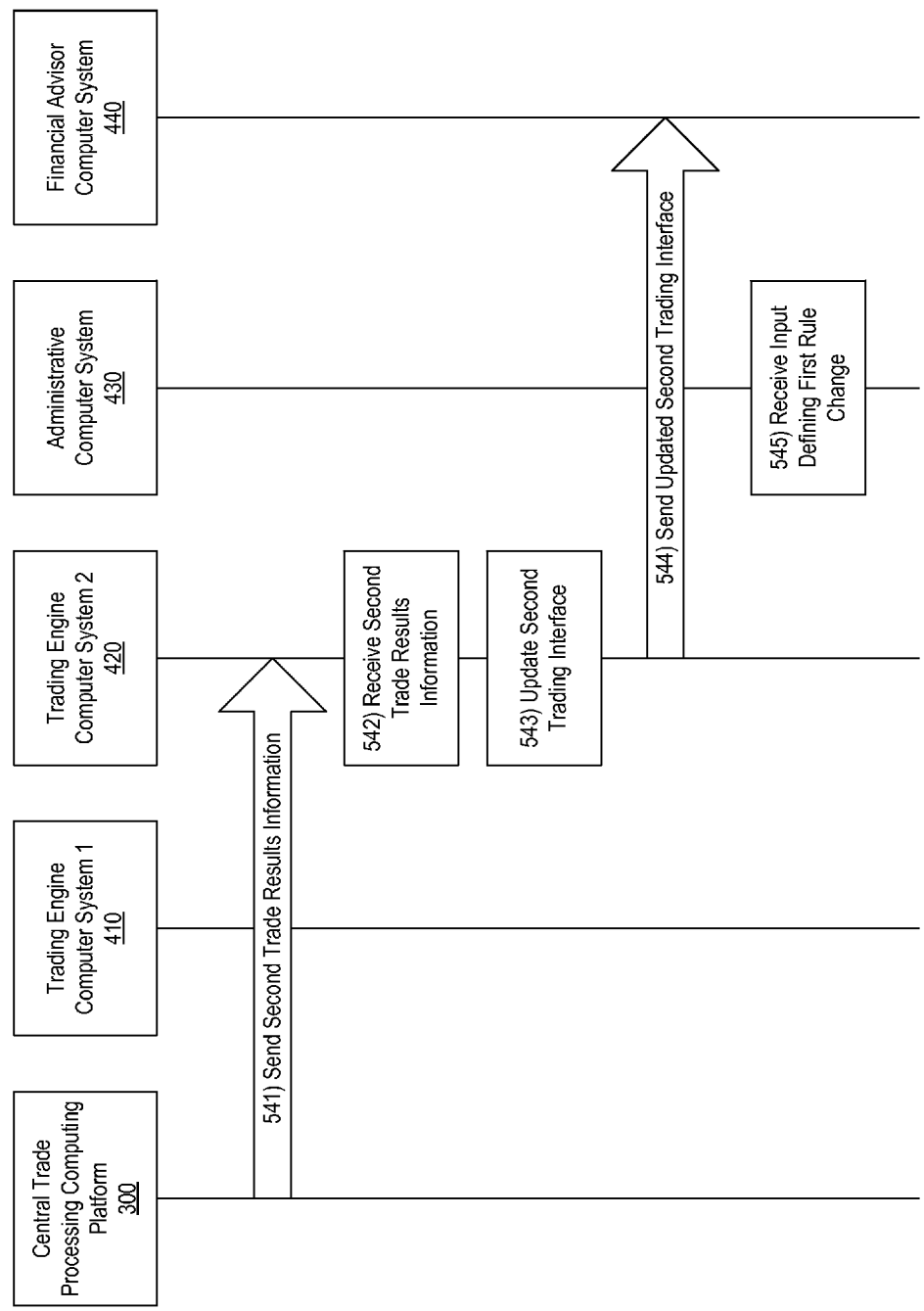

Referring to FIG. 5I, at step 541, central trade processing computing platform 300 may send second trade results information to trading engine computer system 420 (e.g., based on the processing performed by central trade processing computing platform 300 at step 540). For example, at step 541, based on processing the second set of one or more trades associated with the second set of one or more financial products offered via the second trading interface provided by the second trading engine computer system, central trade processing computing platform 300 may send, via the communication interface (e.g., communication interface 325), and to the second trading engine computer system (e.g., trading engine computer system 420), second trade results information.

At step 542, trading engine computer system 420 may receive the second trade results information from central trade processing computing platform 300. At step 543, trading engine computer system 420 may update the second trading interface based on the second trade results information received from central trade processing computing platform 300. At step 544, trading engine computer system 420 may send and/or otherwise provide the updated second trading interface to financial advisor computer system 440.

Figure 5J:
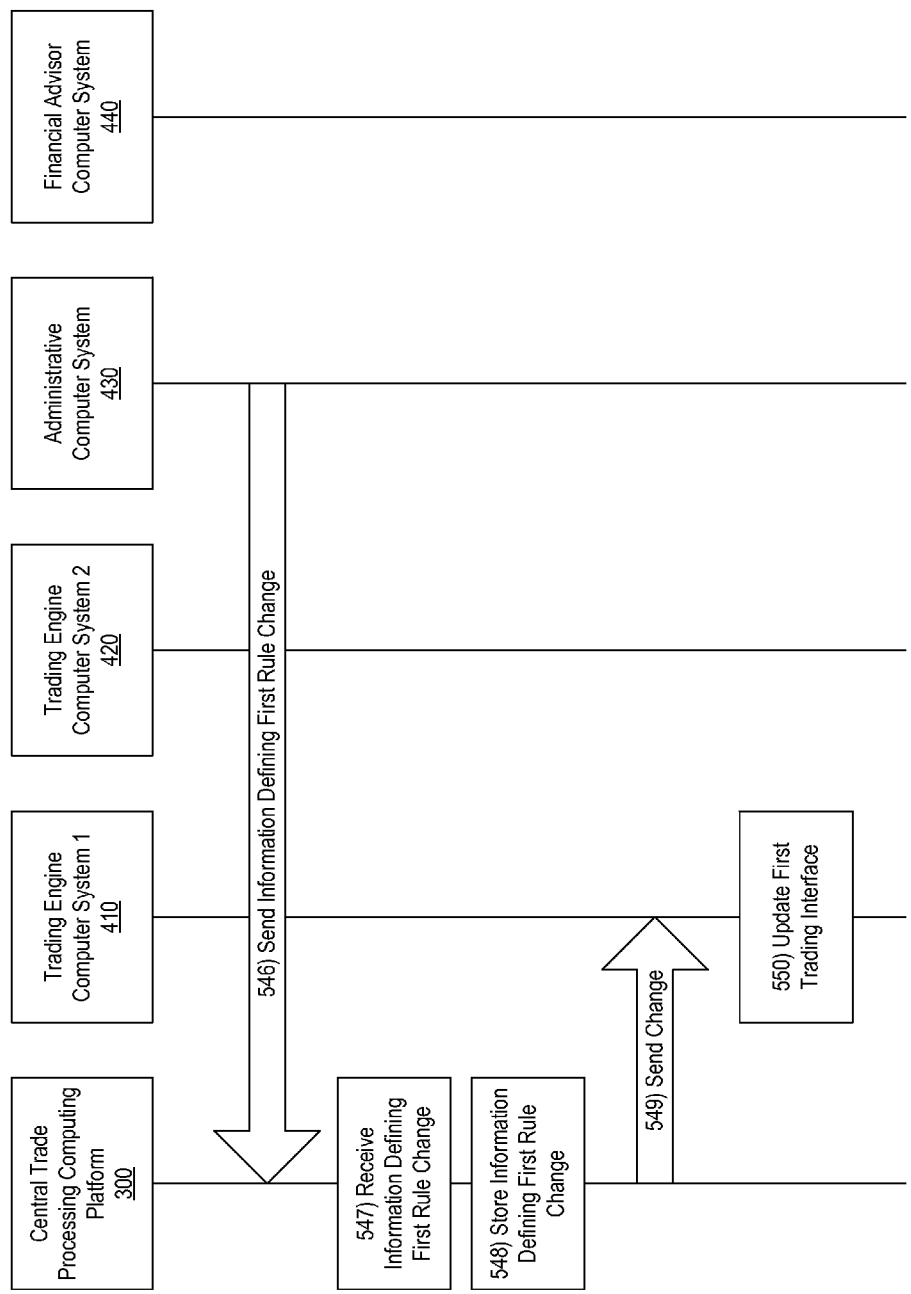

At step 545, administrative computer system 430 may receive input defining a first rule change (e.g., for a first set of products, such as a rule change affecting how certain financial products are traded and/or in which accounts certain financial products are permitted to be traded; for a first trading interface, such as a rule change affecting a trading interface provided by trading engine computer system 410; or the like). Referring to FIG. 5J, at step 546, administrative computer system 430 may send information defining the first rule change to central trade processing computing platform 300.

At step 547, central trade processing computing platform 300 may receive the information defining the first rule change from administrative computer system 430. For example, at step 547, after processing the first set of one or more trades associated with the first set of one or more financial products offered via the first trading interface provided by the first trading engine computer system (e.g., trading engine computer system 410), central trade processing computing platform 300 may receive, via the communication interface (e.g., communication interface 325), and from the administrative computer system (e.g., administrative computer system 430), first rule update information defining at least one rule change to the one or more rules for trading in the first set of one or more financial products offered via the first trading interface provided by the first trading engine computer system (e.g., trading engine computer system 410).

At step 548, central trade processing computing platform 300 may store the information defining the first rule change received from administrative computer system 430. For example, at step 548, central trade processing computing platform 300 may store, in the global funds database maintained by central trade processing computing platform 300 (e.g., global funds database 311), the first rule update information defining the at least one rule change to the one or more rules for trading in the first set of one or more financial products offered via the first trading interface provided by the first trading engine computer system (e.g., trading engine computer system 410).

At step 549, central trade processing computing platform 300 may push and/or otherwise send the information defining the first rule change to trading engine computer system 410 (e.g., based on trading engine computer system 410 providing one or more trading interfaces that are affected by the first rule change). For example, at step 549, central trade processing computing platform 300 may push the at least one rule change to the one or more rules for trading in the first set of one or more financial products to the first trading engine computer system (e.g., trading engine computer system 410) by sending, via the communication interface (e.g., communication interface 325), and to the first trading engine computer system (e.g., trading engine computer system 410), the first rule update information defining the at least one rule change to the one or more rules for trading in the first set of one or more financial products offered via the first trading interface provided by the first trading engine computer system (e.g., trading engine computer system 410). At step 550, trading engine computer system 410 may update the first trading interface based on the information defining the first rule change received from central trade processing computing platform 300.

Figure 5K:
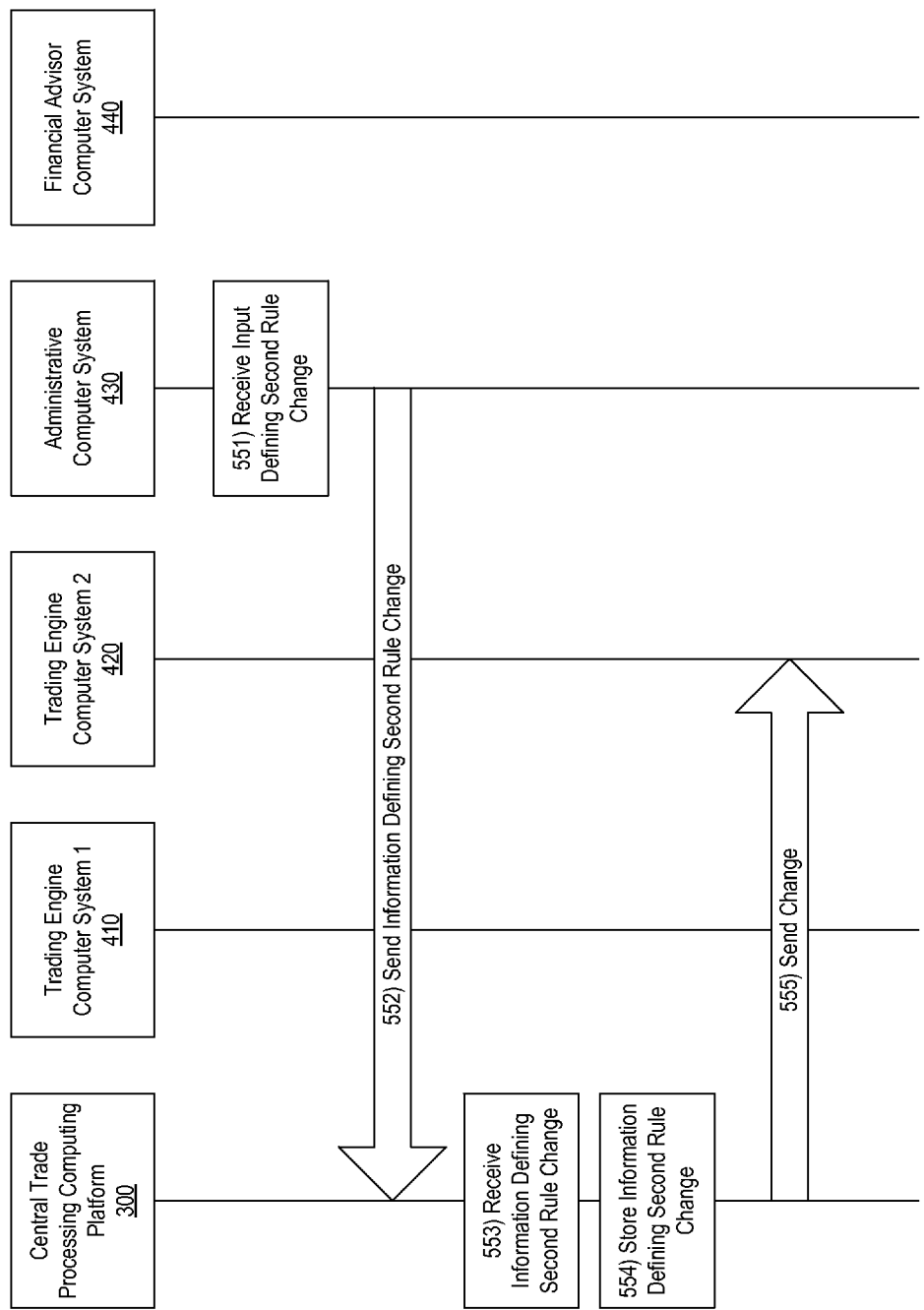

Referring to FIG. 5K, at step 551, administrative computer system 430 may receive input defining a second rule change (e.g., for a second set of products, such as a rule change affecting how certain financial products are traded and/or in which accounts certain financial products are permitted to be traded; for a second trading interface, such as a rule change affecting a trading interface provided by trading engine computer system 420; or the like). At step 552, administrative computer system 430 may send information defining the second rule change to central trade processing computing platform 300.

At step 553, central trade processing computing platform 300 may receive the information defining the second rule change from administrative computer system 430. For example, after processing the second set of one or more trades associated with the second set of one or more financial products offered via the second trading interface provided by the second trading engine computer system (e.g., trading engine computer system 420), central trade processing computing platform 300 may receive, via the communication interface (e.g., communication interface 325), and from the administrative computer system (e.g., administrative computer system 430), second rule update information defining at least one rule change to the one or more rules for trading in the second set of one or more financial products offered via the second trading interface provided by the second trading engine computer system (e.g., trading engine computer system 420).

At step 554, central trade processing computing platform 300 may store the information defining the second rule change received from administrative computer system 430. For example, at step 554, central trade processing computing platform 300 may store, in the global funds database maintained by central trade processing computing platform 300 (e.g., global funds database 311), the second rule update information defining the at least one rule change to the one or more rules for trading in the second set of one or more financial products offered via the second trading interface provided by the second trading engine computer system (e.g., trading engine computer system 420).

Figure 5L:
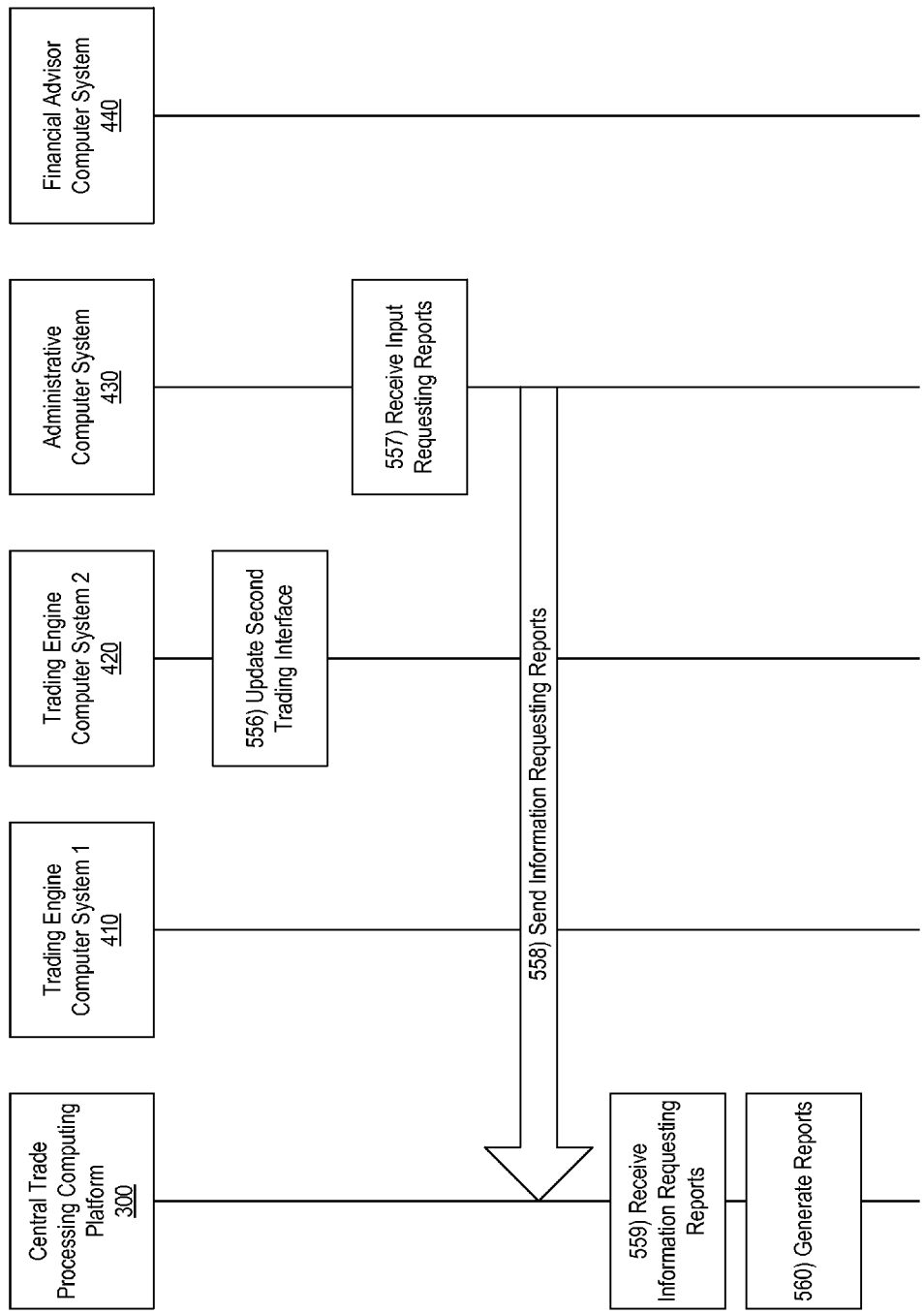
Figure 5M:
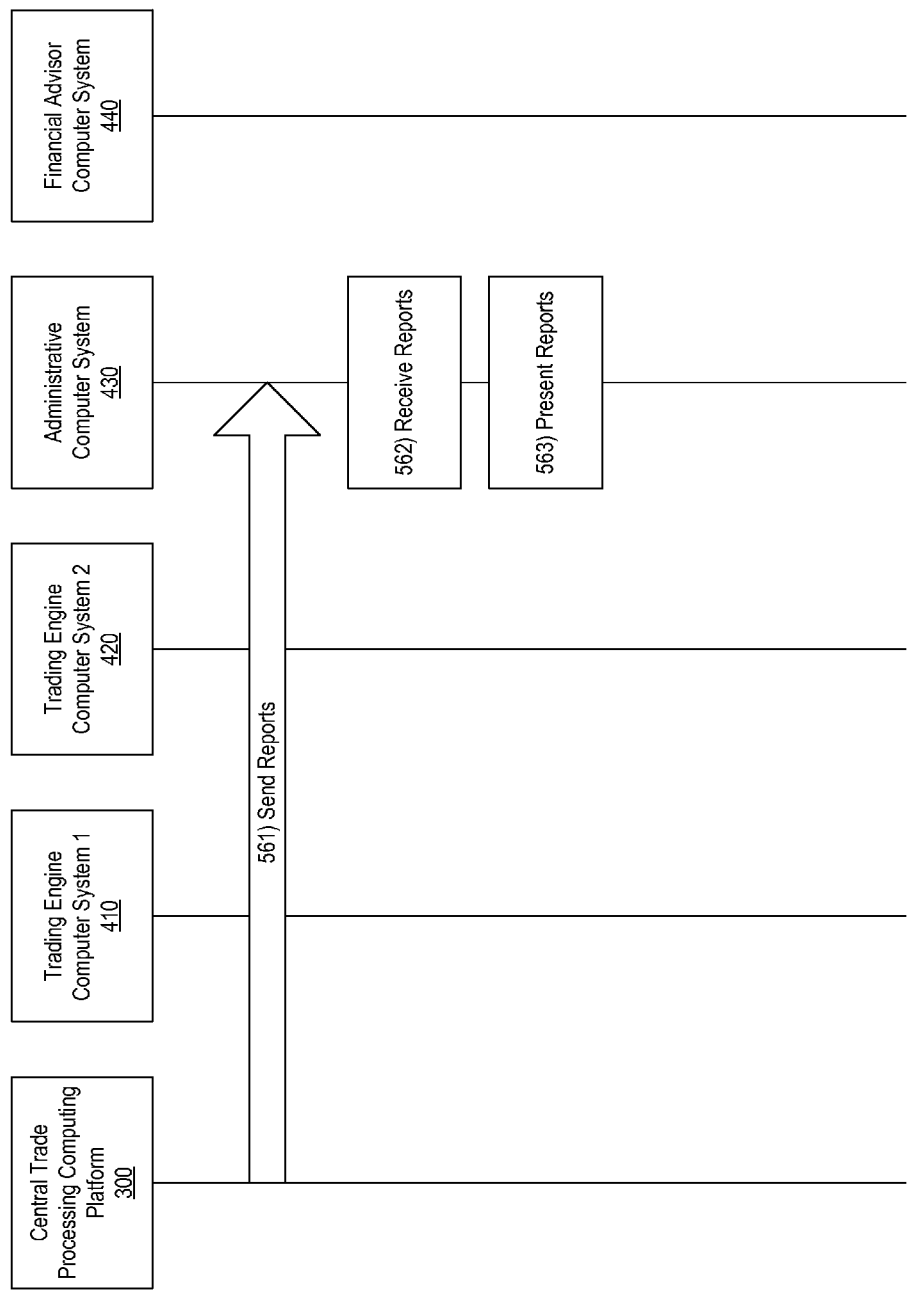

At step 555, central trade processing computing platform 300 may push and/or otherwise send the information defining the second rule change to trading engine computer system 420 (e.g., based on trading engine computer system 420 providing one or more trading interfaces that are affected by the second rule change). For example, at step 555, central trade processing computing platform 300 may push the at least one rule change to the one or more rules for trading in the second set of one or more financial products to the second trading engine computer system (e.g., trading engine computer system 420) by sending, via the communication interface (e.g., communication interface 325), and to the second trading engine computer system (e.g., trading engine computer system 420), the second rule update information defining the at least one rule change to the one or more rules for trading in the second set of one or more financial products offered via the second trading interface provided by the second trading engine computer system (e.g., trading engine computer system 420). Referring to FIG. 5L, at step 556, trading engine computer system 420 may update the second trading interface based on the information defining the second rule change received from central trade processing computing platform 300.

At step 557, administrative computer system 430 may receive input requesting one or more reports (e.g., a trails report, a billing report, or the like). At step 558, administrative computer system 430 may send information requesting the one or more reports to central trade processing computing platform 300. At step 559, central trade processing computing platform 300 may receive the information requesting the one or more reports from administrative computer system 430. For example, at step 559, central trade processing computing platform 300 may receive, via the communication interface (e.g., communication interface 325), and from the administrative computer system (e.g., administrative computer system 430), a request for one or more reports. In some instances, the one or more reports may include at least one trails report comprising financial advisor compensation information. Additionally or alternatively, the one or more reports may include at least one billing report comprising fund group billing information.

At step 560, central trade processing computing platform 300 may generate the one or more reports (e.g., based on the request received from administrative computer system 430 at step 559). For example, at step 560, based on receiving the request for the one or more reports from the administrative computer system, central trade processing computing platform 300 may generate the one or more reports based on the first trade results information and based on the second trade results information. At step 561, central trade processing computing platform 300 may send the one or more generated reports to administrative computer system 430 and/or one or more other computer systems. For example, at step 561, central trade processing computing platform 300 may send, via the communication interface (e.g., communication interface 325), and to the administrative computer system (e.g., administrative computer system 430), the one or more reports generated based on the first trade results information and based on the second trade results information. At step 562, administrative computer system 430 may receive the one or more reports generated by central trade processing computing platform 300. At step 563, administrative computer system 430 may present the one or more reports generated by central trade processing computing platform 300.

In some instances, one or more steps of the example event sequence discussed above may be performed by customer computing device 450 instead of financial advisor computer system 440. For example, in instances in which one or more customer-facing trading interfaces are requested from and/or presented by central trade processing computing platform 300, trading engine computer system 410, and/or trading engine computer system 420, such interfaces may be requested by and/or presented on customer computing device 450 instead of financial advisor computer system 440. Additionally or alternatively, in instances in which one or more financial-advisor-facing trading interfaces are requested from and/or presented by central trade processing computing platform 300, trading engine computer system 410, and/or trading engine computer system 420, such interfaces may be requested by and/or presented on financial advisor computer system 440 instead of customer computing device 450.

Figure 6:
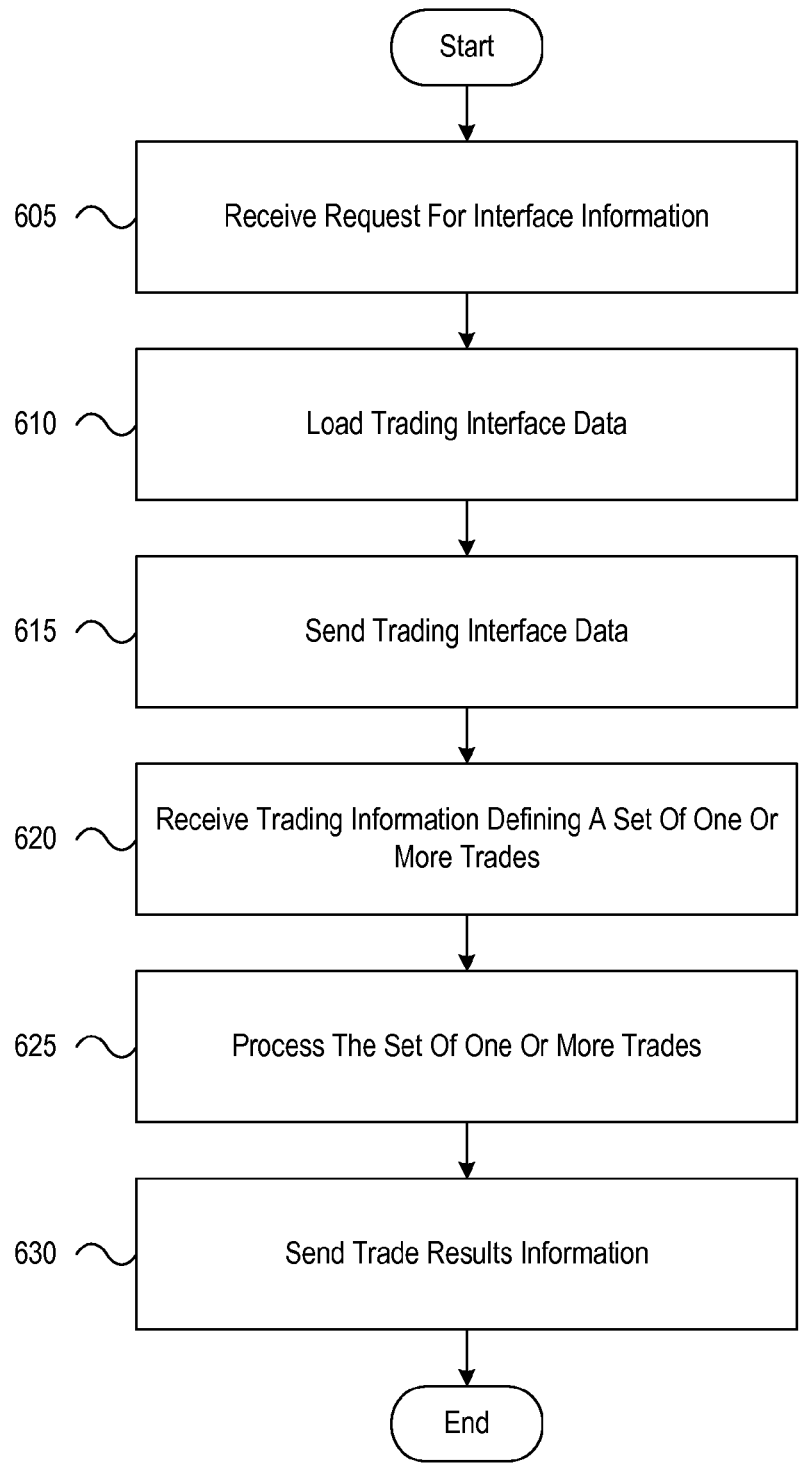
FIG. 6 depicts an illustrative method for integrating multiple trading platforms with a central trade processing system in accordance with one or more example embodiments.

FIG. 6 depicts an illustrative method for integrating multiple trading platforms with a central trade processing system in accordance with one or more example embodiments. Referring to FIG. 6, at step 605, a computing platform may receive, via a communication interface, and from a first trading engine computer system, a first request for first interface information. At step 610, based on receiving the first request for the first interface information from the first trading engine computer system, the computing platform may load first trading interface data, the first trading interface data comprising first product information associated with a first set of one or more financial products offered via a first trading interface provided by the first trading engine computer system and first interface layout information associated with the first trading interface provided by the first trading engine computer system. At step 615, the computing platform may send, via the communication interface, and to the first trading engine computer system, the first trading interface data. At step 620, the computing platform may receive, via the communication interface, and from the first trading engine computer system, first trading information defining a first set of one or more trades associated with the first set of one or more financial products offered via the first trading interface provided by the first trading engine computer system. At step 625, based on the first trading information defining the first set of one or more trades received from the first trading engine computer system, the computing platform may process the first set of one or more trades associated with the first set of one or more financial products offered via the first trading interface provided by the first trading engine computer system. At step 630, based on processing the first set of one or more trades associated with the first set of one or more financial products offered via the first trading interface provided by the first trading engine computer system, the computing platform may send, via the communication interface, and to the first trading engine computer system, first trade results information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a first trading engine computer system, a first request for first interface information;
   based on receiving the first request for the first interface information from the first trading engine computer system, load first trading interface data, the first trading interface data comprising first product information associated with a first set of one or more financial products offered via a first trading interface provided by the first trading engine computer system and first interface layout information associated with the first trading interface provided by the first trading engine computer system;
   send, via the communication interface, and to the first trading engine computer system, the first trading interface data;
   receive, via the communication interface, and from the first trading engine computer system, first trading information defining a first set of one or more trades associated with the first set of one or more financial products offered via the first trading interface provided by the first trading engine computer system;
   based on the first trading information defining the first set of one or more trades received from the first trading engine computer system, process the first set of one or more trades associated with the first set of one or more financial products offered via the first trading interface provided by the first trading engine computer system;
   based on processing the first set of one or more trades associated with the first set of one or more financial products offered via the first trading interface provided by the first trading engine computer system, send, via the communication interface, and to the first trading engine computer system, first trade results information;
   receive, via the communication interface, and from a second trading engine computer system different from the first trading engine computer system, a second request for second interface information;
   based on receiving the second request for the second interface information from the second trading engine computer system, load second trading interface data different from the first trading interface data, the second trading interface data comprising second product information associated with a second set of one or more financial products offered via a second trading interface provided by the second trading engine computer system and second interface layout information associated with the second trading interface provided by the second trading engine computer system;
   send, via the communication interface, and to the second trading engine computer system, the second trading interface data;
   receive, via the communication interface, and from the second trading engine computer system, second trading information defining a second set of one or more trades associated with the second set of one or more financial products offered via the second trading interface provided by the second trading engine computer system;
   based on the second trading information defining the second set of one or more trades received from the second trading engine computer system, process the second set of one or more trades associated with the second set of one or more financial products offered via the second trading interface provided by the second trading engine computer system; and
   based on processing the second set of one or more trades associated with the second set of one or more financial products offered via the second trading interface provided by the second trading engine computer system, send, via the communication interface, and to the second trading engine computer system, second trade results information.

2. The system of claim 1, wherein the first product information associated with the first set of one or more financial products offered via the first trading interface provided by the first trading engine computer system comprises first product rules information defining one or more rules for trading in the first set of one or more financial products offered via the first trading interface provided by the first trading engine computer system.

3. The system of claim 1, wherein the first set of one or more trades associated with the first set of one or more financial products offered via the first trading interface provided by the first trading engine computer system comprises at least one trade associated with at least one mutual fund.

4. The system of claim 1, wherein the first set of one or more trades associated with the first set of one or more financial products offered via the first trading interface provided by the first trading engine computer system comprises at least one trade associated with at least one mutual fund derivative.

5. The system of claim 1, wherein the first trade results information sent to the first trading engine computer system comprises results data configured to cause the first trading engine computer system to present a notification indicating that at least one trade of the first set of one or more trades associated with the first set of one or more financial products offered via the first trading interface provided by the first trading engine computer system is valid and pending execution.

6. The system of claim 1, wherein the first trade results information sent to the first trading engine computer system comprises results data configured to cause the first trading engine computer system to present a notification indicating that at least one trade of the first set of one or more trades associated with the first set of one or more financial products offered via the first trading interface provided by the first trading engine computer system is valid and has been executed.

7. The system of claim 1, wherein the first trade results information sent to the first trading engine computer system comprises results data configured to cause the first trading engine computer system to present a notification indicating that at least one trade of the first set of one or more trades associated with the first set of one or more financial products offered via the first trading interface provided by the first trading engine computer system is invalid and will not be executed.

8. The system of claim 1, wherein the second set of one or more trades associated with the second set of one or more financial products offered via the second trading interface provided by the second trading engine computer system comprises at least one trade associated with at least one mutual fund.

9. The system of claim 1, wherein the second set of one or more trades associated with the second set of one or more financial products offered via the second trading interface provided by the second trading engine computer system comprises at least one trade associated with at least one mutual fund derivative.

10. The system of claim 1, wherein the first trading interface data sent to the first trading engine computer systems configured to cause the first trading engine computer system to present a financial-advisor-facing trading interface, and wherein the second trading interface data sent to the second trading engine computer systems configured to cause the second trading engine computer system to present a customer-facing trading interface.

11. The system of claim 1, wherein the memory stores additional computer-readable instructions that, when executed by the at least one processor, further cause the system to:
    prior to receiving the first request for the first interface information from the first trading engine computer system:
        receive, via the communication interface, and from an administrative computer system, first product rules information defining one or more rubs for trading in the first set of one or more financial products offered via the first trading interface provided by the first trading engine computer system;
        store, in a global funds database maintained by the system, the first product rules information defining the one or more rules for trading in the first set of one or more financial products offered via the first trading interface provided by the first trading engine computer system;
        receive, via the communication interface, and from the administrative computer system, second product rules information defining one or more rules for trading in the second set of one or more financial products offered via the second trading interface provided by the second trading engine computer system; and
        store, in the global funds database maintained by the system, the second product rules information defining the one or more rules for trading in the second set of one or more financial products offered via the second trading interface provided by the second trading engine computer system.

12. The system of claim 11, wherein the memory stores additional computer-readable instructions that, when executed by the at least one processor, further cause the system to:
    after processing the first set of one or more trades associated with the first set of one or more financial products offered via the first trading interface provided by the first trading engine computer system, receive, via the communication interface, and from the administrative computer system, first rule update information defining at least one rule change to the one or more rules for trading in the first set of one or more financial products offered via the first trading interface provided by the first trading engine computer system;
    store, in the global funds database maintained by the system, the first rule update information defining the at least one rule change to the one or more rules for trading in the first set of one or more financial products offered via the first trading interface provided by the first trading engine computer system; and
    push the at least one rule change to the one or more rules for trading in the first set of one or more financial products to the first trading engine computer system by sending, via the communication interface, and to the first trading engine computer system, the first rule update information defining the at least one rule change to the one or more rules for trading in the first set of one or more financial products offered via the first trading interface provided by the first trading engine computer system.

13. The system of claim 12, wherein the memory stores additional computer-readable instructions that, when executed by the at least one processor, further cause the system to:
    after processing the second set of one or more trades associated with the second set of one or more financial products offered via the second trading interface provided by the second trading engine computer system, receive, via the communication interface, and from the administrative computer system, second rule update information defining at least one rule change to the one or more rules for trading in the second set of one or more financial products offered via the second trading interface provided by the second trading engine computer system;
    store, in the global funds database maintained by the system, the second rule update information defining the at least one rule change to the one or more rules for trading in the second set of one or more financial products offered via the second trading interface provided by the second trading engine computer system; and
    push the at least one rule change to the one or more rules for trading in the second set of one or more financial products to the second trading engine computer system by sending, via the communication interface, and to the second trading engine computer system, the second rule update information defining the at least one rule change to the one or more rules for trading in the second set of one or more financial products offered via the second trading interface provided by the second trading engine computer system.

14. The system of claim 11, wherein the memory stores additional computer-readable instructions that, when executed by the at least one processor, further cause the system to:

receive, via the communication interface, and from the administrative computer system, a request for one or more reports;

based on receiving the request for the one or more reports from the administrative computer system, generate the one or more reports based on the first trade results information and based on the second trade results information; and send, via the communication interface, and to the administrative computer system, the one or more reports generated based on the first trade results information and based on the second trade results information.

15. The system of claim 14, wherein the one or more reports comprise at least one trails report comprising financial advisor compensation information.

16. The system of claim 14, wherein the one or more reports comprise at least one billing report comprising fund group billing information.

17. A method, comprising:

at a computing platform comprising at least one processor, memory, and a communication interface:

receiving, by the at least one processor, via the communication interface, and from a first trading engine computer system, a first request for first interface information;

based on receiving the first request for the first interface information from the first trading engine computer system, loading, by the at least one processor, first trading interface data, the first trading interface data comprising first product information associated with a first set of one or more financial products offered via a first trading interface provided by the first trading engine computer system and first interface layout information associated with the first trading interface provided by the first trading engine computer system;

sending, by the at least one processor, via the communication interface, and to the first trading engine computer system, the first trading interface data;

receiving, by the at least one processor, via the communication interface, and from the first trading engine computer system, first trading information defining a first set of one or more trades associated with the first set of one or more financial products offered via the first trading interface provided by the first trading engine computer system;

based on the first trading information defining the first set of one or more trades received from the first trading engine computer system, processing, by the at least one processor the first set of one or more trades associated with the first set of one or more financial products offered via the first trading interface provided by the first trading engine computer system;

based on processing the first set of one or more trades associated with the first set of one or more financial products offered via the first trading interface provided by the first trading engine computer system, sending, by the at least one processor, via the communication interface, and to the first trading engine computer system, first trade results information;

receiving, by the at least one processor, via the communication interface, and from a second trading engine computer system different from the first trading engine computer system, a second request for second interface information;

based on receiving the second request for the second interface information from the second trading engine computer system, loading, by the at least one processor, second trading interface data different from the first trading interface data, the second trading interface data comprising second product information associated with a second set of one or more financial products offered via a second trading interface provided by the second trading engine computer system and second interface layout information associated with the second trading interface provided by the second trading engine computer system;

sending, by the at least one processor, via the communication interface, and to the second trading engine computer system, the second trading interface data;

receiving, by the at least one processor, via the communication interface, and from the second trading engine computer system, second trading information defining a second set of one or more trades associated with the second set of one or more financial products offered via the second trading interface provided by the second trading engine computer system;

based on the second trading information defining the second set of one or more trades received from the second trading engine computer system, processing, by the at least one processor, the second set of one or more trades associated with the second set of one or more financial products offered via the second trading interface provided by the second trading engine computer system; and based on processing the second set of one or more trades associated with the second set of one or more financial products offered via the second trading interface provided by the second trading engine computer system, sending, by the at least one processor, via the communication interface, and to the second trading engine computer system, second trade results information.

18. The method of claim 17, wherein the first product information associated with the first set of one or more financial products offered via the first trading interface provided by the first trading engine computer system comprises first product rules information defining one or more rules for trading in the first set of one or more financial products offered via the first trading interface provided by the first trading engine computer system.

19. One or more non-transitory computer-readable media storing instructions that, when executed by a computer system comprising at least one processor, memory, and a communication interface, cause the computer system to:

receive, via the communication interface, and from a first trading engine computer system, a first request for first interface information;

based on receiving the first request for the first interface information from the first trading engine computer system, bad first trading interface data, the first trading interface data comprising first product information associated with a first set of one or more financial products offered via a first trading interface provided by the first trading engine computer system and first interface layout information associated with the first trading interface provided by the first trading engine computer system;

send, via the communication interface, and to the first trading engine computer system, the first trading interface data;

receive, via the communication interface, and from the first trading engine computer system, first trading information defining a first set of one or more trades associated with the first set of one or more financial products offered via the first trading interface provided by the first trading engine computer system;

based on the first trading information defining the first set of one or more trades received from the first trading engine computer system, process the first set of one or more trades associated with the first set of one or more financial products offered via the first trading interface provided by the first trading engine computer system;

based on processing the first set of one or more trades associated with the first set of one or more financial products offered via the first trading interface provided by the first trading engine computer system, send, via the communication interface, and to the first trading engine computer system, first trade results information;

receive, via the communication interface, and from a second trading engine computer system different from the first trading engine computer system, a second request for second interface information;

based on receiving the second request for the second interface information from the second trading engine computer system, bad second trading interface data different from the first trading interface data, the second trading interface data comprising second product information associated with a second set of one or more financial products offered via a second trading interface provided by the second trading engine computer system and second interface layout information associated with the second trading interface provided by the second trading engine computer system;

send, via the communication interface, and to the second trading engine computer system, the second trading interface data;

receive, via the communication interface, and from the second trading engine computer system, second trading information defining a second set of one or more trades associated with the second set of one or more financial products offered via the second trading interface provided by the second trading engine computer system;

based on the second trading information defining the second set of one or more trades received from the second trading engine computer system, process the second set of one or more trades associated with the second set of one or more financial products offered via the second trading interface provided by the second trading engine computer system; and based on processing the second set of one or more trades associated with the second set of one or more financial products offered via the second trading interface provided by the second trading engine computer system, send, via the communication interface, and to the second trading engine computer system, second trade results information.

\* \* \* \* \*